US008014456B1

(12) United States Patent
Lee et al.

(10) Patent No.: US 8,014,456 B1
(45) Date of Patent: Sep. 6, 2011

(54) PREAMBLE DETECTION WITH MULTIPLE RECEIVE ANTENNAS

(75) Inventors: Jongwon Lee, Cupertino, CA (US); Hui-Ling Lou, Palo Alto, CA (US)

(73) Assignee: Marvell International Ltd., Hamilton (BM)

( * ) Notice: Subject to any disclaimer, the term of this patent is extended or adjusted under 35 U.S.C. 154(b) by 825 days.

(21) Appl. No.: 11/820,397

(22) Filed: Jun. 19, 2007

Related U.S. Application Data

(63) Continuation of application No. 11/753,953, filed on May 25, 2007.

(60) Provisional application No. 60/809,733, filed on May 31, 2006, provisional application No. 60/826,392, filed on Sep. 21, 2006.

(51) Int. Cl.
*H04K 1/10* (2006.01)

(52) U.S. Cl. ........ 375/260; 375/130; 375/142; 375/144; 375/145; 375/147; 375/148; 375/149; 375/150; 375/219; 375/316; 375/340; 375/342; 375/434; 375/347

(58) Field of Classification Search .................. 375/130, 375/142, 147–150, 219, 316, 136, 144–145, 375/260, 340, 342–343, 347
See application file for complete search history.

(56) References Cited

U.S. PATENT DOCUMENTS

| | | | |
|---|---|---|---|
| 3,983,485 A | | 9/1976 | Stuart |
| 5,067,136 A * | | 11/1991 | Arthur et al. .................. 375/142 |
| 5,852,630 A | | 12/1998 | Langberg et al. |
| 5,940,429 A * | | 8/1999 | Lam et al. ..................... 375/130 |
| 6,215,827 B1 | | 4/2001 | Balachandran et al. |
| 6,266,361 B1 * | | 7/2001 | Huang et al. .................. 375/140 |
| 7,006,577 B2 | | 2/2006 | Kim |
| 7,020,183 B2 * | | 3/2006 | Nakamura ..................... 375/150 |
| 7,095,778 B2 | | 8/2006 | Okubo et al. |
| 7,133,688 B2 | | 11/2006 | Das et al. |
| 7,257,165 B2 | | 8/2007 | Gardner |
| 7,333,548 B2 * | | 2/2008 | Chen ............................. 375/260 |
| 7,362,832 B2 | | 4/2008 | Yoshida |
| 7,366,222 B2 * | | 4/2008 | Song et al. .................... 375/130 |
| 7,386,058 B2 * | | 6/2008 | Fujii ............................. 375/267 |
| 7,580,490 B2 | | 8/2009 | Suh et al. |
| 7,590,193 B2 | | 9/2009 | Han |

(Continued)

OTHER PUBLICATIONS

IEEE Std 802.16-2004 (Revision of IEEE Std 802.16-2001) IEE Standard for Local and metropolitan area networks; Part 16: Air Interface for Fixed Broadband Wireless Access Systems; IEEE Computer Society and the IEEE Microwave Theory and Techniquest Society; Oct. 1, 2004; 893 pages.

(Continued)

*Primary Examiner* — Chieh M Fan
*Assistant Examiner* — Sophia Vlahos

(57) ABSTRACT

A system includes a differential demodulation module that differentially demodulates modulated signals received from R antennas. A first summing module sums the differentially demodulated signals to generate a combined signal. A state detection module detects states of X symbols in the combined signal. A second summing module (i) receives Y preamble sequences each comprising X predetermined symbols and (ii) generates X sums for each of the Y preamble sequences by adding each of the states of the X symbols with corresponding states of the X predetermined symbols of each of Y preamble sequences. The states of the X predetermined symbols are generated by inverting states of derived symbols in derived preamble sequences, which are derived from the Y preamble sequences. Each of the Y preamble sequences is different from others of the Y preamble sequences. R, X, and Y are integers greater than 1.

41 Claims, 21 Drawing Sheets

U.S. PATENT DOCUMENTS

| | | | |
|---|---|---|---|
| 7,596,111 B2 * | 9/2009 | Karabinis | 370/316 |
| 7,623,467 B1 | 11/2009 | Sun | |
| 7,643,536 B2 * | 1/2010 | Schaefer et al. | 375/142 |
| 7,656,931 B2 | 2/2010 | Smith et al. | |
| 2004/0136442 A1 | 7/2004 | Laurent | |
| 2005/0047384 A1 * | 3/2005 | Wax et al. | 370/338 |
| 2005/0063480 A1 | 3/2005 | Sang et al. | |
| 2005/0243937 A1 | 11/2005 | Legouable et al. | |
| 2006/0025136 A1 | 2/2006 | Fujita et al. | |
| 2006/0034397 A1 * | 2/2006 | Lee et al. | 375/340 |
| 2006/0082445 A1 | 4/2006 | O'Toole et al. | |
| 2006/0221807 A1 | 10/2006 | Fukuoka et al. | |
| 2006/0222058 A1 * | 10/2006 | Simic et al. | 375/150 |
| 2007/0058524 A1 * | 3/2007 | Modlin et al. | 370/208 |
| 2007/0183306 A1 * | 8/2007 | Akita et al. | 370/208 |
| 2007/0183391 A1 | 8/2007 | Akita et al. | |
| 2008/0086670 A1 | 4/2008 | Krouk et al. | |

OTHER PUBLICATIONS

IEEE Std 802.16e-2005 and IEEE Std 802.16-2004/Cor1-2005 (Amendment and Corrigendum to IEEE Std 802.16-2004) IEE Standard for Local and metropolitan area networks; Part 16: Air Interface for Fixed and Mobile Broadband Wireless Access Systems; Amendment 2: Physical and Medium Access Control Layers for Combined Fixed and Mobile Operation in Licensed Bands and Corrigendum 1; Feb. 8, 2006; 864 pages.

WiMax XX xxx xxx v0.1.2 (Feb. 2006); Mobile WiMax System Profile; WiMax Forum; 2006 WiMax Forum; 90 pages.

* cited by examiner

Preamble modulation series per segment and IDcell
for the 1K FFT mode

| Index | IDcell | Segment | Series to modulate (in hexadecimal format) |
|---|---|---|---|
| 0 | 0 | 0 | 0xA6F294537B285E1844677D133E4D53CCB1F182DE00489E53E6B6E77065C7EE7D0ADBEAF |
| 1 | 1 | 0 | 0x668321CBBE7F462E6C2A07E8BBDA2C7F7946D5F69E35AC8ACF7D64AB4A33C467001F3B2 |
| 2 | 2 | 0 | 0x1C75D30B2DF72CEC9117A0BD8EAF8E0502461FC07456AC906ADE03E9B5AB5E1D3F98C6E |
| 3 | 3 | 0 | 0x5F9A2E5CA7CC69A5227104FB1CC2262809F3B10D0542B9BDFDA4A73A7046096DF0E8D3D |
| 4 | 4 | 0 | 0x82F8A0AB918138D84BB86224F6C342D81BC8BFE791CA9EB54096159D672E91C6E13032F |
| 5 | 5 | 0 | 0xEE27E59B84CCF15BB1565EF90D478CD2C49EE8A70DE368EED7C9420B0C6FFAF9AF035FC |
| 6 | 6 | 0 | 0xC1DF5AE28D1CA6A8917BCDAF4E73BD93F931C44F93C3F12F0132FB643EFD5885C8B2BCB |
| 7 | 7 | 0 | 0xFCA36CCCF7F3E0602696DF745A68DB948C57DFA9575BEA1F05725C42155898F0A63A248 |
| ......  | | | |

FIG. 4

PREAMBLE DETECTION WITH MULTIPLE RECEIVE ANTENNAS

CROSS-REFERENCE TO RELATED APPLICATIONS

This application is a continuation of U.S. application Ser. No. 11/753,953, filed May 25, 2007, which application claims the benefit of U.S. Provisional Application No. 60/809,733, filed on May 31, 2006, and U.S. Provisional Application No. 60/826,392, filed on Sep. 21, 2006. The disclosures of the above applications are incorporated herein by reference in their entirety.

FIELD

The present disclosure relates to communication systems, and more particularly to detecting preamble sequences in systems using orthogonal frequency domain multiplexing (OFDM).

BACKGROUND

The background description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present disclosure.

Referring now to FIG. 1, a typical communication system 10 comprises an information source 12, a transmitter 13, a communication channel 20, a receiver 27, and a destination 28. The transmitter 13 comprises a source encoder 14, a channel encoder 16, and a modulator 18. The receiver 27 comprises a demodulator 22, a channel decoder 24, and a source decoder 26.

The information source 12 may be an analog source such as a sensor that outputs information as continuous waveforms or a digital source such as a computer that outputs information in a digital form. The source encoder 14 converts the output of the information source 12 into a sequence of binary digits (bits) called an information sequence u. The channel encoder 16 converts the information sequence u into a discrete encoded sequence v called a codeword. The modulator 18 transforms the codeword into a waveform of duration T seconds that is suitable for transmission.

The waveform output by the modulator 18 is transmitted via the communication channel 20. Typical examples of the communication channel 20 are telephone lines, wireless communication channels, optical fiber cables, etc. Noise, such as electromagnetic interference, inter-channel crosstalk, etc., may corrupt the waveform.

The demodulator 22 receives the waveform. The demodulator 22 processes each waveform and generates a received sequence r that is either a discrete (quantized) or a continuous output. The channel decoder 24 converts the received sequence r into a binary sequence u' called an estimated information sequence. The source decoder 26 converts u' into an estimate of the output of the information source 12 and delivers the estimate to the destination 28. The estimate may be a faithful reproduction of the output of the information source 12 when u' resembles u despite decoding errors that may be caused by the noise.

Communication systems use different modulation schemes to modulate and transmit data. For example, a radio frequency (RF) carrier may be modulated using techniques such as frequency modulation, phase modulation, etc. In wireline communication systems, a transmitted signal generally travels along a path in a transmission line between a transmitter and a receiver. In wireless communication systems, however, a transmitted signal may travel along multiple paths. This is because the transmitted signal may be reflected and deflected by objects such as buildings, towers, airplanes, cars, etc., before the transmitted signal reaches a receiver. Each path may be of different length. Thus, the receiver may receive multiple versions of the transmitted signal. The multiple versions may interfere with each other causing inter symbol interference (ISI). Thus, retrieving original data from the transmitted signal may be difficult.

To alleviate this problem, wireless communication systems often use a modulation scheme called orthogonal frequency division multiplexing (OFDM). In OFDM, a wideband carrier signal is converted into a series of independent narrowband sub-carrier signals that are adjacent to each other in frequency domain. Data to be transmitted is split into multiple parallel data streams. Each data stream is modulated using a sub-carrier. A channel over which the modulated data is transmitted comprises a sum of the narrowband sub-carrier signals, which may overlap.

When each sub-carrier closely resembles a rectangular pulse, modulation can be easily performed by Inverse Discrete Fourier Transform (IDFT), which can be efficiently implemented as an Inverse Fast Fourier Transform (IFFT). When IFFT is used, the spacing of sub-carriers in the frequency domain is such that when the receiver processes a received signal at a particular frequency, all other signals are nearly zero at that frequency, and ISI is avoided. This property is called orthogonality, and hence the modulation scheme is called orthogonal frequency division multiplexing (OFDM).

Referring now to FIGS. 2A-2C, a wireless communication system 50 may comprise base stations BS1, BS2, and BS3 (collectively BS) and one or more mobile stations (MS). Each BS may comprise a processor 30, a medium access controller (MAC) 32, a physical layer (PHY) module 34, and an antenna 36 as shown in FIG. 2B. Similarly, each MS may comprise a processor 40, a medium access controller (MAC) 42, a physical layer (PHY) module 44, and an antenna 46 as shown in FIG. 2C. The PHY modules 34 and 44 may comprise radio frequency (RF) transceivers (not shown) that transmit and receive data via antennas 36 and 46, respectively. Each BS and MS may transmit and receive data while the MS moves relative to the BS.

Specifically, each BS may transmit data using orthogonal frequency division multiplexing access (OFDMA) system. Each BS may transmit data typically in three segments: SEG1, SEG2, and SEG3. The MS, which moves relative to each BS, may receive data from one or more base stations depending on the location of the MS relative to each BS. For example, the MS may receive data from SEG 3 of BS1 and SEG 2 of BS2 when the MS is located as shown in FIG. 2A.

Relative motion between MS and BS may cause Doppler shifts in signals received by the MS. This can be problematic since systems using OFDMA are inherently sensitive to carrier frequency offsets (CFO). Therefore, pilot tones are generally used for channel estimation refinement. For example, some of the sub-carriers may be designated as pilot tones for correcting residual frequency offset errors.

Additionally, the PHY module 34 of each BS typically adds a preamble to a data frame that is to be transmitted. Specifically, the PHY module 34 modulates and encodes the data frame comprising the preamble at a data rate specified by the MAC 34 and transmits the data frame. When the PHY module 44 of the MS receives the data frame, the PHY module 44 uses the preamble in the data frame to detect a beginning of packet transmission and to synchronize to a transmitter clock of the BS.

According to the I.E.E.E. standard 802.16e, which is incorporated herein by reference in its entirety, a first symbol in the data frame transmitted by the BS is a preamble symbol from a preamble sequence. The preamble sequence typically contains an identifier called IDcell, which is a cell ID of the BS, and segment information. The BS selects the preamble sequence based on the IDcell and the segment number of the BS. Each BS may select different preamble sequences. Additionally, each BS may select preamble sequences that are distinct among the segments of that BS.

The BS modulates multiple sub-carriers with the selected preamble sequence. Thereafter, the BS performs IFFT, adds a cyclic prefix, and transmits a data frame. The MS uses the cyclic prefix to perform symbol timing and fractional carrier frequency synchronization. Unless the MS knows the preamble sequence, however, the MS cannot associate itself to a particular segment of a particular BS.

SUMMARY

A system comprises a differential demodulation module, a summing module, and a correlation module. The differential demodulation module receives modulated signals from R antennas and differentially demodulates the modulated signals to generate differentially demodulated signals, where R is an integer greater than or equal to 1. The summing module sums the differentially demodulated signals and that generates a combined signal. The correlation module correlates the combined signal with derived preamble sequences and generates correlation values.

In another feature, the modulated signals include sub-carriers that are modulated using orthogonal frequency domain multiplexing (OFDM). Every $P^{th}$ one of the sub-carriers is modulated with a preamble bit, where P is an integer greater than or equal to 1.

In another feature, every $P^{th}$ one of the sub-carriers has substantially the same channel phase. Each of the correlation values has a real part and an imaginary part. The system further comprises a control module that selects one of the correlation values having a largest real part and that detects a preamble sequence in the modulated signals when the largest real part is greater than or equal to a predetermined threshold. The predetermined threshold is based on the signal strength of the modulated signals. The control module identifies a segment of a base station that transmitted the modulated signals based on the preamble sequence.

In another feature, every $P^{th}$ one of the sub-carriers has substantially the same differential channel phase. The system further comprises a control module that selects a largest correlation value from the correlation values and that detects a preamble sequence in the modulated signals when a magnitude of the largest correlation value is greater than or equal to a predetermined threshold. The predetermined threshold is based on the signal strength of the modulated signals. The control module identifies a segment of a base station that transmitted the modulated signals based on the preamble sequence.

In another feature, the differential demodulation module generates the differentially demodulated signals by multiplying a $Q^{th}$ one of the modulated signals by a complex conjugate of a $(Q+P)^{th}$ one of the modulated signals, where Q is an integer greater than or equal to 1.

In another feature, the derived preamble sequences are derived from preamble sequences, wherein each of the preamble sequences is different from others of the preamble sequences. The derived preamble sequences are stored in the correlation module.

In another feature, each bit of one of the derived preamble sequences has a first state when a corresponding bit and a bit adjacent to the corresponding bit in a corresponding one of the preamble sequences have opposite states. Each bit has a second state when the corresponding bit and the bit adjacent to the corresponding bit have the same state.

In another feature, the derived preamble sequences have a cross-correlation value that is less than or equal to a predetermined cross-correlation threshold. The predetermined cross-correlation threshold is less than approximately 0.2 for an orthogonal frequency domain multiplexing (OFDM) system using a 1024 fast Fourier transform (FFT) mode.

In another feature, the modulated signals include a fractional carrier frequency offset (CFO) that generates a phase error that is substantially the same in each one of the modulated signals.

In another feature, the modulated signals include an integer carrier frequency offset (CFO) that generates a phase error that is substantially the same in each one of the modulated signals. The correlation module correlates the derived preamble sequences with the differentially demodulated signals having the integer CFO.

In another feature, the modulated signals include a linearly increasing phase offset generated by a symbol timing offset. The control module calculates a symbol timing offset by multiplying a phase angle of the largest correlation value by $(N/2\pi P)$, where N is a number of sub-carriers in an N fast Fourier transform (FFT) mode, and where N is an integer greater than 1. N is one of 128, 512, 1024, and 2048.

In another feature, a physical layer (PHY) device comprises the system and further comprises R transceiver modules that communicate with the differential demodulation module and that receive the modulated signals. A network device comprises the PHY device and further comprises the R antennas that communicate with corresponding ones of the R transceiver modules.

In still other features, a method comprises receiving modulated signals from R antennas, where R is an integer greater than or equal to 1, differentially demodulating the modulated signals, and generating differentially demodulated signals. The method further comprises summing the differentially demodulated signals and generating a combined signal. The method further comprises correlating the combined signal with derived preamble sequences and generating correlation values.

In another feature, the method further comprises differentially demodulating the modulated signals that include sub-carriers modulated using orthogonal frequency domain multiplexing (OFDM). Every $P^{th}$ one of the sub-carriers is modulated with a preamble bit, where P is an integer greater than or equal to 1.

In another feature, every $P^{th}$ one of the sub-carriers has substantially the same channel phase. Each of the correlation values has a real part and an imaginary part. The method further comprises selecting one of the correlation values having a largest real part and detecting a preamble sequence in the modulated signals when the largest real part is greater than or equal to a predetermined threshold. The method further comprises calculating the predetermined threshold based on the signal strength of the modulated signals. The method further comprises identifying a segment of a base station that transmitted the modulated signals based on the preamble sequence.

In another feature, every $P^{th}$ one of the sub-carriers has substantially the same differential channel phase. The method further comprises selecting a largest correlation value from the correlation values and detecting a preamble sequence in the modulated signals when the magnitude of the largest correlation value is greater than or equal to a predetermined threshold. The method further comprises calculating the predetermined threshold based on the signal strength of the modulated signals. The method further comprises identifying a segment of a base station that transmitted the modulated signals based on the preamble sequence.

In another feature, the method further comprises generating the differentially demodulated signals by multiplying a $Q^{th}$ one of the modulated signals by a complex conjugate of a $(Q+P)^{th}$ one of the modulated signals, where Q is an integer greater than or equal to 1.

In another feature, the method further comprises deriving the derived preamble sequences from preamble sequences and storing the derived preamble sequences, wherein each of the preamble sequences is different from others of the preamble sequences.

In another feature, each bit of one of the derived preamble sequences has a first state when a corresponding bit and a bit adjacent to the corresponding bit in a corresponding one of the preamble sequences have opposite states. Each bit has a second state when the corresponding bit and the bit adjacent to the corresponding bit have the same state.

In another feature, the derived preamble sequences have a cross-correlation value that is less than or equal to a predetermined cross-correlation threshold. The predetermined cross-correlation threshold is less than approximately 0.2 for an orthogonal frequency domain multiplexing (OFDM) system using a 1024 fast Fourier transform (FFT) mode.

In another feature, the method further comprises differentially demodulating the modulated signals that include a fractional carrier frequency offset (CFO), wherein the fractional CFO generates a phase error that is substantially the same in each one of the modulated signals.

In another feature, the method further comprises differentially demodulating the modulated signals that include an integer carrier frequency offset (CFO), wherein the integer CFO generates a phase error that is substantially the same in each one of the modulated signals. The method further comprises correlating the derived preamble sequences with the differentially demodulated signals having the integer CFO.

In another feature, the method further comprises differentially demodulating the modulated signals that include a linearly increasing phase offset generated by a symbol timing offset. The method further comprises calculating a symbol timing offset by multiplying a phase angle of the largest correlation value by $(N/2\pi P)$, where N is a number of sub-carriers in an N fast Fourier transform (FFT) mode, and where N is an integer greater than 1. N is one of 128, 512, 1024, and 2048.

In another feature, the method further comprises receiving the modulated signals from the R antennas via corresponding ones of R transceiver modules of a physical layer (PHY) device.

In still other features, a system comprises differential demodulation means for differentially demodulating modulated signals received from R antennas and generating differentially demodulated signals, where R is an integer greater than or equal to 1. The system further comprises summing means for summing the differentially demodulated signals and generating a combined signal. The system further comprises correlation means for correlating the combined signal with derived preamble sequences and generating correlation values.

In another feature, the modulated signals include sub-carriers that are modulated using orthogonal frequency domain multiplexing (OFDM). Every $P^{th}$ one of the sub-carriers is modulated with a preamble bit, where P is an integer greater than or equal to 1.

In another feature, every $P^{th}$ one of the sub-carriers has substantially the same channel phase. Each of the correlation values has a real part and an imaginary part. The system further comprises control means for selecting one of the correlation values having a largest real part and detecting a preamble sequence in the modulated signals when the largest real part is greater than or equal to a predetermined threshold. The predetermined threshold is based on the signal strength of the modulated signals. The control means identifies a segment of a base station that transmitted the modulated signals based on the preamble sequence.

In another feature, every $P^{th}$ one of the sub-carriers has substantially the same differential channel phase. The system further comprises control means for selecting a largest correlation value from the correlation values and detecting a preamble sequence in the modulated signals when a magnitude of the largest correlation value is greater than or equal to a predetermined threshold. The predetermined threshold is based on the signal strength of the modulated signals. The control means identifies a segment of a base station that transmitted the modulated signals based on the preamble sequence.

In another feature, the differential demodulation means generates the differentially demodulated signals by multiplying a $Q^{th}$ one of the modulated signals by a complex conjugate of a $(Q+P)^{th}$ one of the modulated signals, where Q is an integer greater than or equal to 1.

In another feature, the derived preamble sequences are derived from preamble sequences, wherein each of the preamble sequences is different from others of the preamble sequences. The derived preamble sequences are stored in the correlation means.

In another feature, each bit of one of the derived preamble sequences has a first state when a corresponding bit and a bit adjacent to the corresponding bit in a corresponding one of the preamble sequences have opposite states. Each bit has a second state when the corresponding bit and the bit adjacent to the corresponding bit have the same state.

In another feature, the derived preamble sequences have a cross-correlation value that is less than or equal to a predetermined cross-correlation threshold. The predetermined cross-correlation threshold is less than approximately 0.2 for an orthogonal frequency domain multiplexing (OFDM) system using a 1024 fast Fourier transform (FFT) mode.

In another feature, the modulated signals include a fractional carrier frequency offset (CFO) that generates a phase error that is substantially the same in each one of the modulated signals.

In another feature, the modulated signals include an integer carrier frequency offset (CFO) that generates a phase error that is substantially the same in each one of the modulated signals. The correlation means correlates the derived preamble sequences with the differentially demodulated signals having the integer CFO.

In another feature, the modulated signals include a linearly increasing phase offset generated by a symbol timing offset. The control means calculates a symbol timing offset by multiplying a phase angle of the largest correlation value by $(N/2\pi P)$, where N is a number of sub-carriers in an N fast Fourier transform (FFT) mode, and where N is an integer greater than 1. N is one of 128, 512, 1024, and 2048.

In another feature, a physical layer (PHY) device comprises the system and further comprises R transceiver means for communicating with the differential demodulation means and receiving the modulated signals. A network device comprises the PHY device and further comprises the R antennas that communicate with corresponding ones of the R transceiver means.

In still other features, a computer program executed by a processor comprises receiving modulated signals from R antennas, where R is an integer greater than or equal to 1, differentially demodulating the modulated signals, and generating differentially demodulated signals. The computer program further comprises summing the differentially demodulated signals and generating a combined signal. The computer program further comprises correlating the combined signal with derived preamble sequences and generating correlation values.

In another feature, the computer program further comprises differentially demodulating the modulated signals that include sub-carriers modulated using orthogonal frequency domain multiplexing (OFDM). Every $P^{th}$ one of the sub-carriers is modulated with a preamble bit, where P is an integer greater than or equal to 1.

In another feature, every $P^{th}$ one of the sub-carriers has substantially the same channel phase. Each of the correlation values has a real part and an imaginary part. The computer program further comprises selecting one of the correlation values having a largest real part and detecting a preamble sequence in the modulated signals when the largest real part is greater than or equal to a predetermined threshold. The computer program further comprises calculating the predetermined threshold based on the signal strength of the modulated signals. The computer program further comprises identifying a segment of a base station that transmitted the modulated signals based on the preamble sequence.

In another feature, every $P^{th}$ one of the sub-carriers has substantially the same differential channel phase. The computer program further comprises selecting a largest correlation value from the correlation values and detecting a preamble sequence in the modulated signals when the magnitude of the largest correlation value is greater than or equal to a predetermined threshold. The computer program further comprises calculating the predetermined threshold based on the signal strength of the modulated signals. The computer program further comprises identifying a segment of a base station that transmitted the modulated signals based on the preamble sequence.

In another feature, the computer program further comprises generating the differentially demodulated signals by multiplying a $Q^{th}$ one of the modulated signals by a complex conjugate of a $(Q+P)^{th}$ one of the modulated signals, where Q is an integer greater than or equal to 1.

In another feature, the computer program further comprises deriving the derived preamble sequences from preamble sequences and storing the derived preamble sequences, wherein each of the preamble sequences is different from others of the preamble sequences.

In another feature, each bit of one of the derived preamble sequences has a first state when a corresponding bit and a bit adjacent to the corresponding bit in a corresponding one of the preamble sequences have opposite states. Each bit has a second state when the corresponding bit and the bit adjacent to the corresponding bit have the same state.

In another feature, the derived preamble sequences have a cross-correlation value that is less than or equal to a predetermined cross-correlation threshold. The predetermined cross-correlation threshold is less than approximately 0.2 for an orthogonal frequency domain multiplexing (OFDM) system using a 1024 fast Fourier transform (FFT) mode.

In another feature, the computer program further comprises differentially demodulating the modulated signals that include a fractional carrier frequency offset (CFO), wherein the fractional CFO generates a phase error that is substantially the same in each one of the modulated signals.

In another feature, the computer program further comprises differentially demodulating the modulated signals that include an integer carrier frequency offset (CFO), wherein the integer CFO generates a phase error that is substantially the same in each one of the modulated signals. The computer program further comprises correlating the derived preamble sequences with the differentially demodulated signals having the integer CFO.

In another feature, the computer program further comprises differentially demodulating the modulated signals that include a linearly increasing phase offset generated by a symbol timing offset. The computer program further comprises calculating a symbol timing offset by multiplying a phase angle of the largest correlation value by $(N/2\pi P)$, where N is a number of sub-carriers in an N fast Fourier transform (FFT) mode, and where N is an integer greater than 1. N is one of 128, 512, 1024, and 2048.

In another feature, the computer program further comprises receiving the modulated signals from the R antennas via corresponding ones of R transceiver modules of a physical layer (PHY) device.

In still other features, a system comprises a differential demodulation module, a first summing module, a state detection module, and a second summing module. The differential demodulation module receives modulated signals from R antennas and differentially demodulates the modulated signals to generate differentially demodulated signals, where R is an integer greater than 1. The first summing module sums the differentially demodulated signals and generates a combined signal. The state detection module detects states of X symbols in the combined signal, where X is an integer greater than 1 and where each of the X symbols has one of a first state and a second state. The second summing module receives Y preamble sequences each comprising X predetermined symbols, where Y is an integer greater than 0. The second summing module generates X sums for each of the Y preamble sequences by adding each of the states of the X symbols with corresponding states of the X predetermined symbols of each of Y preamble sequences.

In another feature, the modulated signals include sub-carriers that are modulated using orthogonal frequency domain multiplexing (OFDM). Every $P^{th}$ one of the sub-carriers is modulated with a preamble symbol from one of the Y preamble sequences, where P is an integer greater than or equal to 1. Every $P^{th}$ one of the sub-carriers has one of substantially the same channel phase and substantially the same differential channel phase.

In another feature, the differential demodulation module generates the differentially demodulated signals by multiplying a $Q^{th}$ one of the modulated signals by a complex conjugate of a $(Q+P)^{th}$ one of the modulated signals, where Q is an integer greater than or equal to 1.

In another feature, the states of the X symbols in the combined signal are states of real parts of the X symbols when imaginary parts of the X symbols are approximately equal to zero. The X sums are modulo-2 sums. The states of the X predetermined symbols are generated by inverting states of derived symbols in derived preamble sequences. The derived preamble sequences are derived from the Y preamble sequences. Each of the Y preamble sequences is different from others of the Y preamble sequences.

In another feature, each of the derived symbols of one of the derived preamble sequences has a first binary value when a corresponding symbol and a symbol adjacent to the corresponding symbol in a corresponding one of the Y preamble sequences have opposite binary values. Each of the derived symbols has a second binary value that is opposite to the first binary value when the corresponding symbol and the symbol adjacent to the corresponding symbol have the same binary value.

In another feature, the derived preamble sequences have a cross-correlation value that is less than or equal to a predetermined cross-correlation threshold. The predetermined cross-correlation threshold is less than approximately 0.2 for an orthogonal frequency domain multiplexing (OFDM) system using a 1024 fast Fourier transform (FFT) mode.

In another feature, the second summing module generates cross-correlation values by adding the X sums generated for each of the Y preamble sequences. The system further comprises a control module that communicates with the differential demodulation module and the second summing module. The control module selects a largest one of the cross-correlation values and detects one of the Y preamble sequences in the modulated signals when the largest one of the cross-correlation values is greater than or equal to a predetermined threshold. The control module selects the largest of the cross-correlation values based on the signal strength of the modulated signals. The predetermined threshold is based on the signal strength of the modulated signals. The control module identifies a segment of a base station that transmitted the modulated signals based on the one of the Y preamble sequences detected in the modulated signals.

In another feature, the system further comprises a correlation module that communicates with the differential demodulation module and the control module. The correlation module generates correlation values by correlating at least one of the differentially demodulated signals and at least one of derived preamble sequences that generate at least two of the cross-correlation values. The cross-correlation values are greater than the predetermined threshold and are substantially the same.

In another feature, the control module selects one of the correlation values having a largest real part, detects one of the Y preamble sequences in the modulated signals based on the largest real part, and identifies a segment of a base station that transmitted the modulated signals based on the one of the Y preamble sequence detected in the modulated signals.

In another feature, the control module selects one of the correlation values having a largest magnitude, detects one of the preamble sequences in the modulated signals based on the largest magnitude, and identifies a segment of a base station that transmitted the modulated signals based on the one of the Y preamble sequence detected in the modulated signals.

In another feature, the modulated signals include a fractional carrier frequency offset (CFO) that generates a phase error that is substantially the same in each one of the modulated signals.

In another feature, the modulated signals include an integer carrier frequency offset (CFO) that generates a phase error that is substantially the same in each one of the modulated signals. The control module generates an estimate for an integer carrier frequency offset (CFO) present in the modulated signals when the control module selects the largest of the cross-correlation values.

In another feature, a physical layer (PHY) device comprises the system and further comprises R transceiver modules that communicate with the differential demodulation module and that receive the modulated signals. A network device comprises the PHY device and further comprises the R antennas that communicate with corresponding ones of the R transceiver modules.

In still other features, a method comprises receiving modulated signals from R antennas, where R is an integer greater than 1, differentially demodulating the modulated signals, and generating differentially demodulated signals. The method further comprises summing the differentially demodulated signals and generating a combined signal. The method further comprises detecting states of X symbols in the combined signal, where X is an integer greater than 1 and where each of the X symbols has one of a first state and a second state. The method further comprises receiving Y preamble sequences each comprising X predetermined symbols, where Y is an integer greater than 0. The method further comprises generating X sums for each of the Y preamble sequences by adding each of the states of the X symbols with corresponding states of the X predetermined symbols of each of Y preamble sequences.

In another feature, the method further comprises differentially demodulating the modulated signals that include sub-carriers modulated using orthogonal frequency domain multiplexing (OFDM). Every $P^{th}$ one of the sub-carriers is modulated with a preamble symbol from one of the Y preamble sequences, where P is an integer greater than or equal to 1. Every $P^{th}$ one of the sub-carriers has one of substantially the same channel phase and substantially the same differential channel phase.

In another feature, the method further comprises generating the differentially demodulated signals by multiplying a $Q^{th}$ one of the modulated signals by a complex conjugate of a $(Q+P)^{th}$ one of the modulated signals, where Q is an integer greater than or equal to 1.

In another feature, the states of the X symbols in the combined signal are states of real parts of the X symbols when imaginary parts of the X symbols are approximately equal to zero. The X sums are modulo-2 sums.

In another feature, the method further comprises generating the states of the X predetermined symbols by inverting states of derived symbols in derived preamble sequences. The derived preamble sequences are derived from the Y preamble sequences. Each of the Y preamble sequences is different from others of the Y preamble sequences.

In another feature, each of the derived symbols of one of the derived preamble sequences has a first binary value when a corresponding symbol and a symbol adjacent to the corresponding symbol in a corresponding one of the Y preamble sequences have opposite binary values. Each of the derived symbols has a second binary value that is opposite to the first binary value when the corresponding symbol and the symbol adjacent to the corresponding symbol have the same binary value.

In another feature, the derived preamble sequences have a cross-correlation value that is less than or equal to a predetermined cross-correlation threshold. The predetermined cross-correlation threshold is less than approximately 0.2 for an orthogonal frequency domain multiplexing (OFDM) method using a 1024 fast Fourier transform (FFT) mode.

In another feature, the method further comprises generating cross-correlation values by adding the X sums generated for each of the Y preamble sequences. The method further comprises selecting a largest one of the cross-correlation values and detecting one of the Y preamble sequences in the modulated signals when the largest one of the cross-correlation values is greater than or equal to a predetermined threshold. The method further comprises selecting the largest of the cross-correlation values based on the signal strength of the modulated signals. The method further comprises calculating the predetermined threshold based on the signal strength of the modulated signals. The method further comprises identifying a segment of a base station that transmitted the modulated signals based on the one of the Y preamble sequences detected in the modulated signals.

In another feature, the method further comprises generating correlation values by correlating at least one of the differentially demodulated signals and at least one of derived preamble sequences that generate at least two of the cross-correlation values. The cross-correlation values are greater than the predetermined threshold and are substantially the same.

In another feature, the method further comprises selecting one of the correlation values having a largest real part, detecting one of the Y preamble sequences in the modulated signals based on the largest real part, and identifying a segment of a base station that transmitted the modulated signals based on the one of the Y preamble sequence detected in the modulated signals.

In another feature, the method further comprises selecting one of the correlation values having a largest magnitude, detecting one of the preamble sequences in the modulated signals based on the largest magnitude, and identifying a segment of a base station that transmitted the modulated signals based on the one of the Y preamble sequence detected in the modulated signals.

In another feature, the method further comprises differentially demodulating the modulated signals that include a fractional carrier frequency offset (CFO), wherein the fractional CFO generates a phase error that is substantially the same in each one of the modulated signals.

In another feature, the method further comprises differentially demodulating the modulated signals that include an integer carrier frequency offset (CFO), wherein the integer CFO generates a phase error that is substantially the same in each one of the modulated signals. The method further comprises generating an estimate for an integer carrier frequency offset (CFO) present in the modulated signals when selecting the largest of the cross-correlation values.

In another feature, the method further comprises receiving the modulated signals from the R antennas via corresponding ones of R transceiver modules of a physical layer (PHY) device.

In still other features, a system comprises differential demodulation means for differentially demodulating modulated signals received from R antennas and generating differentially demodulated signals, where R is an integer greater than 1. The system further comprises first summing means for summing the differentially demodulated signals and generating a combined signal. The system further comprises state detection means for detecting states of X symbols in the combined signal, where X is an integer greater than 1 and where each of the X symbols has one of a first state and a second state. The system further comprises second summing means for receiving Y preamble sequences each comprising X predetermined symbols, where Y is an integer greater than 0. The summing means generates X sums for each of the Y preamble sequences by adding each of the states of the X symbols with corresponding states of the X predetermined symbols of each of Y preamble sequences.

In another feature, the modulated signals include sub-carriers that are modulated using orthogonal frequency domain multiplexing (OFDM). Every $P^{th}$ one of the sub-carriers is modulated with a preamble symbol from one of the Y preamble sequences, where P is an integer greater than or equal to 1. Every $P^{th}$ one of the sub-carriers has one of substantially the same channel phase and substantially the same differential channel phase.

In another feature, the differential demodulation means generates the differentially demodulated signals by multiplying a $Q^{th}$ one of the modulated signals by a complex conjugate of a $(Q+P)^{th}$ one of the modulated signals, where Q is an integer greater than or equal to 1.

In another feature, the states of the X symbols in the combined signal are states of real parts of the X symbols when imaginary parts of the X symbols are approximately equal to zero. The X sums are modulo-2 sums. The states of the X predetermined symbols are generated by inverting states of derived symbols in derived preamble sequences. The derived preamble sequences are derived from the Y preamble sequences. Each of the Y preamble sequences is different from others of the Y preamble sequences.

In another feature, each of the derived symbols of one of the derived preamble sequences has a first binary value when a corresponding symbol and a symbol adjacent to the corresponding symbol in a corresponding one of the Y preamble sequences have opposite binary values. Each of the derived symbols has a second binary value that is opposite to the first binary value when the corresponding symbol and the symbol adjacent to the corresponding symbol have the same binary value.

In another feature, the derived preamble sequences have a cross-correlation value that is less than or equal to a predetermined cross-correlation threshold. The predetermined cross-correlation threshold is less than approximately 0.2 for an orthogonal frequency domain multiplexing (OFDM) system using a 1024 fast Fourier transform (FFT) mode.

In another feature, the second summing means generates cross-correlation values by adding the X sums generated for each of the Y preamble sequences. The system further comprises control means for communicating with the differential demodulation means and the second summing means. The control means selects a largest one of the cross-correlation values and detects one of the Y preamble sequences in the modulated signals when the largest one of the cross-correlation values is greater than or equal to a predetermined threshold. The control means selects the largest of the cross-correlation values based on the signal strength of the modulated signals. The predetermined threshold is based on the signal strength of the modulated signals. The control means identifies a segment of a base station that transmitted the modulated signals based on the one of the Y preamble sequences detected in the modulated signals.

In another feature, the system further comprises correlation means for communicating with the differential demodulation means and the control means. The correlation means generates correlation values by correlating at least one of the differentially demodulated signals and at least one of derived preamble sequences that generate at least two of the cross-correlation values. The cross-correlation values are greater than the predetermined threshold and are substantially the same.

In another feature, the control means selects one of the correlation values having a largest real part, detects one of the Y preamble sequences in the modulated signals based on the largest real part, and identifies a segment of a base station that transmitted the modulated signals based on the one of the Y preamble sequence detected in the modulated signals.

In another feature, the control means selects one of the correlation values having a largest magnitude, detects one of the preamble sequences in the modulated signals based on the largest magnitude, and identifies a segment of a base station that transmitted the modulated signals based on the one of the Y preamble sequence detected in the modulated signals.

In another feature, the modulated signals include a fractional carrier frequency offset (CFO) that generates a phase error that is substantially the same in each one of the modulated signals.

In another feature, the modulated signals include an integer carrier frequency offset (CFO) that generates a phase error that is substantially the same in each one of the modulated signals. The control means generates an estimate for an integer carrier frequency offset (CFO) present in the modulated signals when the control means selects the largest of the cross-correlation values.

In another feature, a physical layer (PHY) device comprises the system and further comprises R transceiver means for communicating with the differential demodulation means and receiving the modulated signals. A network device comprises the PHY device and further comprises the R antennas that communicate with corresponding ones of the R transceiver means.

In still other features, a computer program executed by a processor comprises receiving modulated signals from R antennas, where R is an integer greater than 1, differentially demodulating the modulated signals, and generating differentially demodulated signals. The computer program further comprises summing the differentially demodulated signals and generating a combined signal. The computer program further comprises detecting states of X symbols in the combined signal, where X is an integer greater than 1 and where each of the X symbols has one of a first state and a second state. The computer program further comprises receiving Y preamble sequences each comprising X predetermined symbols, where Y is an integer greater than 0. The computer program further comprises generating X sums for each of the Y preamble sequences by adding each of the states of the X symbols with corresponding states of the X predetermined symbols of each of Y preamble sequences.

In another feature, the computer program further comprises differentially demodulating the modulated signals that include sub-carriers modulated using orthogonal frequency domain multiplexing (OFDM). Every $P^{th}$ one of the sub-carriers is modulated with a preamble symbol from one of the Y preamble sequences, where P is an integer greater than or equal to 1. Every $P^{th}$ one of the sub-carriers has one of substantially the same channel phase and substantially the same differential channel phase.

In another feature, the computer program further comprises generating the differentially demodulated signals by multiplying a $Q^{th}$ one of the modulated signals by a complex conjugate of a $(Q+P)^{th}$ one of the modulated signals, where Q is an integer greater than or equal to 1.

In another feature, the states of the X symbols in the combined signal are states of real parts of the X symbols when imaginary parts of the X symbols are approximately equal to zero. The X sums are modulo-2 sums.

In another feature, the computer program further comprises generating the states of the X predetermined symbols by inverting states of derived symbols in derived preamble sequences. The derived preamble sequences are derived from the Y preamble sequences. Each of the Y preamble sequences is different from others of the Y preamble sequences.

In another feature, each of the derived symbols of one of the derived preamble sequences has a first binary value when a corresponding symbol and a symbol adjacent to the corresponding symbol in a corresponding one of the Y preamble sequences have opposite binary values. Each of the derived symbols has a second binary value that is opposite to the first binary value when the corresponding symbol and the symbol adjacent to the corresponding symbol have the same binary value.

In another feature, the derived preamble sequences have a cross-correlation value that is less than or equal to a predetermined cross-correlation threshold. The predetermined cross-correlation threshold is less than approximately 0.2 for an orthogonal frequency domain multiplexing (OFDM) computer program using a 1024 fast Fourier transform (FFT) mode.

In another feature, the computer program further comprises generating cross-correlation values by adding the X sums generated for each of the Y preamble sequences. The computer program further comprises selecting a largest one of the cross-correlation values and detecting one of the Y preamble sequences in the modulated signals when the largest one of the cross-correlation values is greater than or equal to a predetermined threshold. The computer program further comprises selecting the largest of the cross-correlation values based on the signal strength of the modulated signals. The computer program further comprises calculating the predetermined threshold based on the signal strength of the modulated signals. The computer program further comprises identifying a segment of a base station that transmitted the modulated signals based on the one of the Y preamble sequences detected in the modulated signals.

In another feature, the computer program further comprises generating correlation values by correlating at least one of the differentially demodulated signals and at least one of derived preamble sequences that generate at least two of the cross-correlation values. The cross-correlation values are greater than the predetermined threshold and are substantially the same.

In another feature, the computer program further comprises selecting one of the correlation values having a largest real part, detecting one of the Y preamble sequences in the modulated signals based on the largest real part, and identifying a segment of a base station that transmitted the modulated signals based on the one of the Y preamble sequence detected in the modulated signals.

In another feature, the computer program further comprises selecting one of the correlation values having a largest magnitude, detecting one of the preamble sequences in the modulated signals based on the largest magnitude, and identifying a segment of a base station that transmitted the modulated signals based on the one of the Y preamble sequence detected in the modulated signals.

In another feature, the computer program further comprises differentially demodulating the modulated signals that include a fractional carrier frequency offset (CFO), wherein the fractional CFO generates a phase error that is substantially the same in each one of the modulated signals.

In another feature, the computer program further comprises differentially demodulating the modulated signals that include an integer carrier frequency offset (CFO), wherein the integer CFO generates a phase error that is substantially the same in each one of the modulated signals. The computer program further comprises generating an estimate for an integer carrier frequency offset (CFO) present in the modulated signals when selecting the largest of the cross-correlation values.

In another feature, the computer program further comprises receiving the modulated signals from the R antennas via corresponding ones of R transceiver modules of a physical layer (PHY) device.

In still other features, a system comprises a correlation module and a control module. The correlation module receives modulated signals from R antennas, correlates each of the modulated signals with Y preamble sequences, and generates Y correlation values for each of the R antennas, where R and Y are integers greater than or equal to 1. The control module generates correlation sums by adding each of the Y correlation values for one of the R antennas to corresponding ones of the Y correlation values for others of the R antennas. The control module selects a largest correlation sum from the correlation sums and detects one of the preamble sequences in the modulated signals when a magnitude of the largest correlation sum is greater than or equal to a first predetermined threshold. The first predetermined threshold is based on the signal strength of the modulated signals.

In another feature, each of the Y preamble sequences comprises preamble bits and is different from others of the preamble sequences. The Y preamble sequences are stored in one of the correlation module and the control module.

In another feature, the control module identifies a segment of a base station that transmitted the modulated signals based on the one of the Y preamble sequences.

In another feature, the modulated signals include sub-carriers that are modulated using orthogonal frequency domain multiplexing (OFDM). Every $P^{th}$ one of the sub-carriers is modulated with a preamble bit of one of the Y preamble sequences, where P is an integer greater than or equal to 1. The sub-carriers have a common channel gain and a random channel phase.

In another feature, the Y preamble sequences have a cross-correlation value of less than or equal to a second predetermined threshold. The second predetermined threshold is less than approximately 0.2 for an orthogonal frequency domain multiplexing (OFDM) system using a 1024 fast Fourier transform (FFT) mode.

In another feature, the modulated signals include a fractional carrier frequency offset (CFO) that generates a phase error that is substantially the same in each one of the modulated signals.

In another feature, the modulated signals include an integer carrier frequency offset (CFO) that generates a phase error that is substantially the same in each one of the modulated signals.

In another feature, a physical layer (PHY) device comprises the system and further comprises R transceiver modules that communicate with the correlation module and the control module and that receive the modulated signals. A network device comprises the PHY device and further comprises the R antennas that communicate with corresponding ones of the R transceiver modules.

In another feature, the control module divides N of the sub-carriers into L bands when a channel gain of the sub-carriers is not substantially the same for all of the sub-carriers, where N and L are integers greater than or equal to 1, and where each of the L bands includes N/L of the sub-carriers.

In another feature, the correlation module correlates symbols in every $P^{th}$ one of the N/L sub-carriers in each of the L bands with corresponding symbols in each of the preamble sequences and generates intra-band correlation values for each band for each of the Y preamble sequences, where P is an integer greater than or equal to 1.

In another feature, the control module generates a band correlation value for each of the L bands and for each of the preamble sequences by adding the intra-band correlation values. The control module generates a magnitude of each of the band correlation value and generates the correlation values by adding the magnitude of each of the band correlation value for each of the Y preamble sequences.

In still other features, a method comprises receiving modulated signals from R antennas, where R and Y are integers greater than or equal to 1, correlating each of the modulated signals with Y preamble sequences, and generating Y correlation values for each of the R antennas. The method further comprises generating correlation sums by adding each of the Y correlation values for one of the R antennas to corresponding ones of the Y correlation values for others of the R antennas. The method further comprises selecting a largest correlation sum from the correlation sums and detecting one of the preamble sequences in the modulated signals when a magnitude of the largest correlation sum is greater than or equal to a first predetermined threshold. The method further comprises calculating the first predetermined threshold based on the signal strength of the modulated signals.

In another feature, the method further comprises storing the Y preamble sequences, wherein each of the Y preamble sequences comprises preamble bits and is different from others of the preamble sequences.

In another feature, the method further comprises identifying a segment of a base station that transmitted the modulated signals based on the one of the Y preamble sequences.

In another feature, the method further comprises correlating the modulated signals that include sub-carriers that are modulated using orthogonal frequency domain multiplexing (OFDM). Every $P^{th}$ one of the sub-carriers is modulated with a preamble bit of one of the Y preamble sequences, where P is an integer greater than or equal to 1. The sub-carriers have a common channel gain and a random channel phase.

In another feature, the Y preamble sequences have a cross-correlation value of less than or equal to a second predetermined threshold. The second predetermined threshold is less than approximately 0.2 for an orthogonal frequency domain multiplexing (OFDM) method using a 1024 fast Fourier transform (FFT) mode.

In another feature, the method further comprises correlating the modulated signals that include a fractional carrier frequency offset (CFO), wherein the fractional CFO generates a phase error that is substantially the same in each one of the modulated signals.

In another feature, the method further comprises correlating the modulated signals that include an integer carrier frequency offset (CFO), wherein the integer CFO generates a phase error that is substantially the same in each one of the modulated signals.

In another feature, the method further comprises receiving the modulated signals from the R antennas via corresponding ones of R transceiver modules of a physical layer (PHY) device.

In another feature, the method further comprises dividing N of the sub-carriers into L bands when a channel gain of the sub-carriers is not substantially the same for all of the sub-carriers, where N and L are integers greater than or equal to 1, and where each of the L bands includes N/L of the sub-carriers.

In another feature, the method further comprises correlating symbols in every $P^{th}$ one of the N/L sub-carriers in each of the L bands with corresponding symbols in each of the preamble sequences and generating intra-band correlation values for each band for each of the Y preamble sequences, where P is an integer greater than or equal to 1.

In another feature, the method further comprises generating a band correlation value for each of the L bands and for each of the preamble sequences by adding the intra-band correlation values. The method further comprises generating a magnitude of each of the band correlation value and generating the correlation values by adding the magnitude of each of the band correlation value for each of the Y preamble sequences.

In still other features, a system comprises correlation means for receiving modulated signals from R antennas, correlating each of the modulated signals with Y preamble sequences, and generating Y correlation values for each of the R antennas, where R and Y are integers greater than or equal to 1. The system further comprises control means for generating correlation sums by adding each of the Y correlation values for one of the R antennas to corresponding ones of the Y correlation values for others of the R antennas. The control means selects a largest correlation sum from the correlation sums and detects one of the preamble sequences in the modulated signals when a magnitude of the largest correlation sum is greater than or equal to a first predetermined threshold. The first predetermined threshold is based on the signal strength of the modulated signals.

In another feature, each of the Y preamble sequences comprises preamble bits and is different from others of the preamble sequences. The Y preamble sequences are stored in one of the correlation means and the control means.

In another feature, the control means identifies a segment of a base station that transmitted the modulated signals based on the one of the Y preamble sequences.

In another feature, the modulated signals include sub-carriers that are modulated using orthogonal frequency domain multiplexing (OFDM). Every $P^{th}$ one of the sub-carriers is modulated with a preamble bit of one of the Y preamble sequences, where P is an integer greater than or equal to 1. The sub-carriers have a common channel gain and a random channel phase.

In another feature, the Y preamble sequences have a cross-correlation value of less than or equal to a second predetermined threshold. The second predetermined threshold is less than approximately 0.2 for an orthogonal frequency domain multiplexing (OFDM) system using a 1024 fast Fourier transform (FFT) mode.

In another feature, the modulated signals include a fractional carrier frequency offset (CFO) that generates a phase error that is substantially the same in each one of the modulated signals.

In another feature, the modulated signals include an integer carrier frequency offset (CFO) that generates a phase error that is substantially the same in each one of the modulated signals.

In another feature, a physical layer (PHY) device comprises the system and further comprises R transceiver means for communicating with the correlation means and the control means and receiving the modulated signals. A network device comprises the PHY device and further comprises the R antennas that communicate with corresponding ones of the R transceiver means.

In another feature, the control means divides N of the sub-carriers into L bands when a channel gain of the sub-carriers is not substantially the same for all of the sub-carriers, where N and L are integers greater than or equal to 1, and where each of the L bands includes N/L of the sub-carriers.

In another feature, the correlation means correlates symbols in every $P^{th}$ one of the N/L sub-carriers in each of the L bands with corresponding symbols in each of the preamble sequences and generates intra-band correlation values for each band for each of the Y preamble sequences, where P is an integer greater than or equal to 1.

In another feature, the control means generates a band correlation value for each of the L bands and for each of the preamble sequences by adding the intra-band correlation values. The control means generates a magnitude of each of the band correlation value and generates the correlation values by adding the magnitude of each of the band correlation value for each of the Y preamble sequences.

In still other features, a computer program executed by a processor comprises receiving modulated signals from R antennas, where R and Y are integers greater than or equal to 1, correlating each of the modulated signals with Y preamble sequences, and generating Y correlation values for each of the R antennas. The computer program further comprises generating correlation sums by adding each of the Y correlation values for one of the R antennas to corresponding ones of the Y correlation values for others of the R antennas. The computer program further comprises selecting a largest correlation sum from the correlation sums and detecting one of the preamble sequences in the modulated signals when a magnitude of the largest correlation sum is greater than or equal to a first predetermined threshold. The computer program further comprises calculating the first predetermined threshold based on the signal strength of the modulated signals.

In another feature, the computer program further comprises storing the Y preamble sequences, wherein each of the Y preamble sequences comprises preamble bits and is different from others of the preamble sequences.

In another feature, the computer program further comprises identifying a segment of a base station that transmitted the modulated signals based on the one of the Y preamble sequences.

In another feature, the computer program further comprises correlating the modulated signals that include sub-carriers that are modulated using orthogonal frequency domain multiplexing (OFDM). Every $P^{th}$ one of the sub-carriers is modulated with a preamble bit of one of the Y preamble sequences, where P is an integer greater than or equal to 1. The sub-carriers have a common channel gain and a random channel phase.

In another feature, the Y preamble sequences have a cross-correlation value of less than or equal to a second predetermined threshold. The second predetermined threshold is less than approximately 0.2 for an orthogonal frequency domain multiplexing (OFDM) computer program using a 1024 fast Fourier transform (FFT) mode.

In another feature, the computer program further comprises correlating the modulated signals that include a fractional carrier frequency offset (CFO), wherein the fractional CFO generates a phase error that is substantially the same in each one of the modulated signals.

In another feature, the computer program further comprises correlating the modulated signals that include an integer carrier frequency offset (CFO), wherein the integer CFO generates a phase error that is substantially the same in each one of the modulated signals.

In another feature, the computer program further comprises receiving the modulated signals from the R antennas via corresponding ones of R transceiver modules of a physical layer (PHY) device.

In another feature, the computer program further comprises dividing N of the sub-carriers into L bands when a channel gain of the sub-carriers is not substantially the same for all of the sub-carriers, where N and L are integers greater than or equal to 1, and where each of the L bands includes N/L of the sub-carriers.

In another feature, the computer program further comprises correlating symbols in every $P^{th}$ one of the N/L sub-carriers in each of the L bands with corresponding symbols in each of the preamble sequences and generating intra-band correlation values for each band for each of the Y preamble sequences, where P is an integer greater than or equal to 1.

In another feature, the computer program further comprises generating a band correlation value for each of the L bands and for each of the preamble sequences by adding the intra-band correlation values. The computer program further comprises generating a magnitude of each of the band correlation value and generating the correlation values by adding the magnitude of each of the band correlation value for each of the Y preamble sequences.

In still other features, the systems and methods described above are implemented by a computer program executed by one or more processors. The computer program can reside on a computer readable medium such as but not limited to memory, non-volatile data storage and/or other suitable tangible storage mediums.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 4 is a table showing preamble sequences used by base stations of FIG. 3 to transmit data;

DETAILED DESCRIPTION

Figure 1:
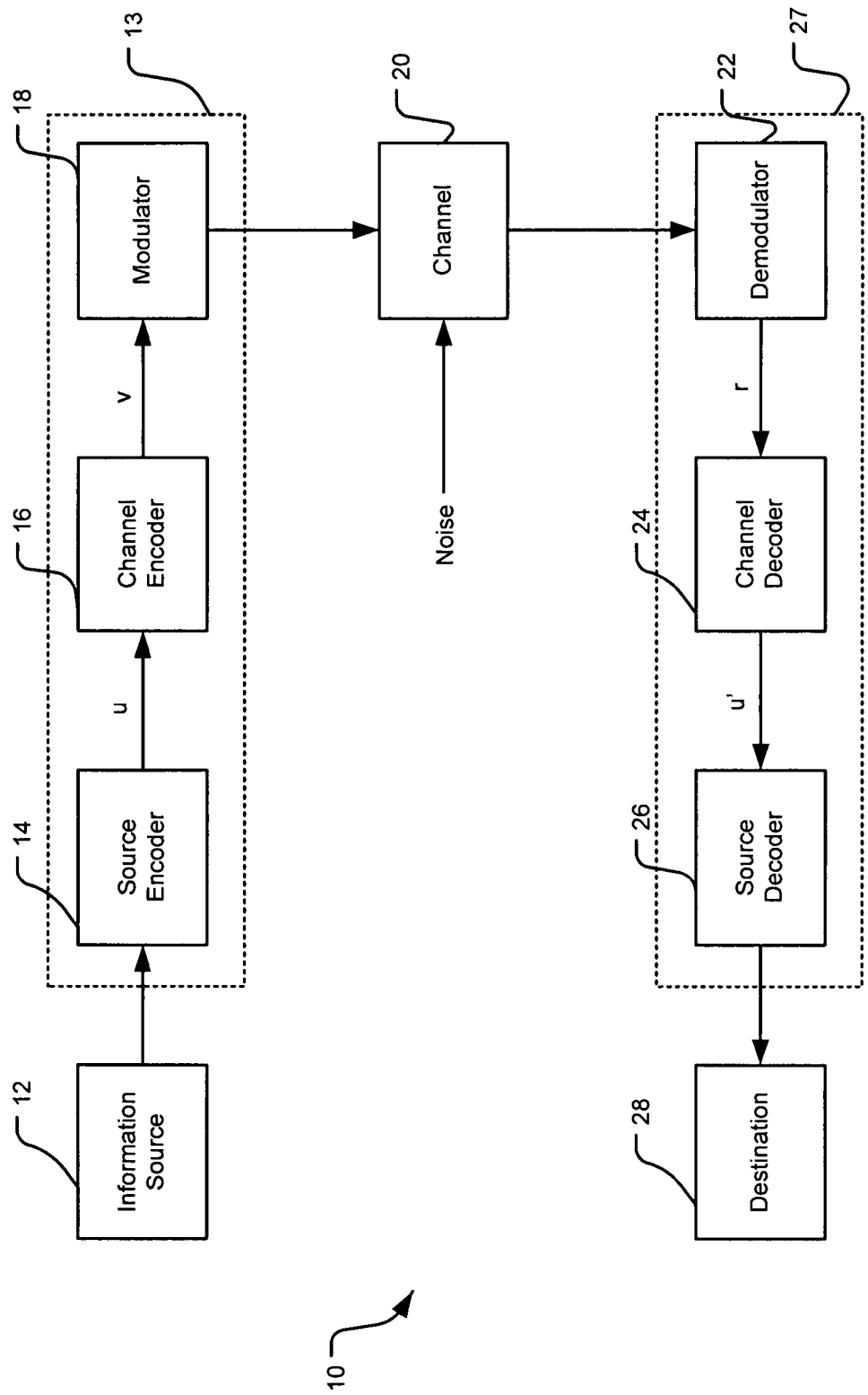
FIG. 1 is a functional block diagram of an exemplary communication system according to the prior art.
Figure 2A:
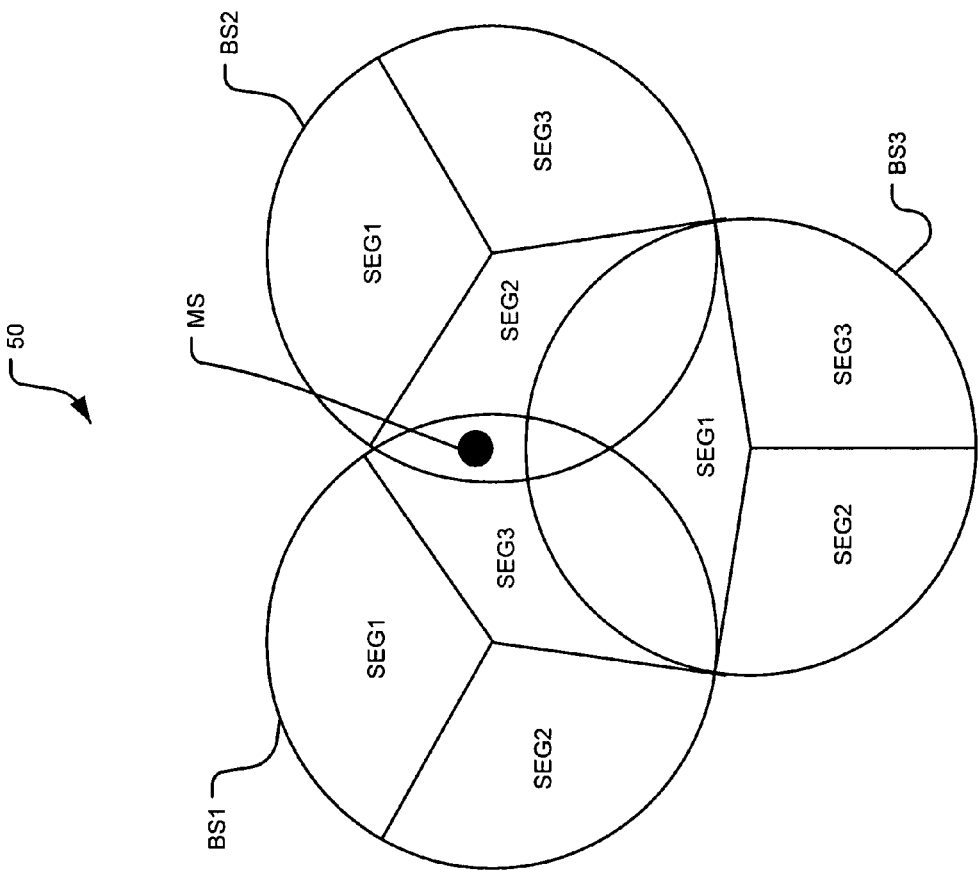
FIG. 2A is a schematic representation of an exemplary wireless communication system comprising three base stations and a mobile station according to the prior art.
Figure 2B:
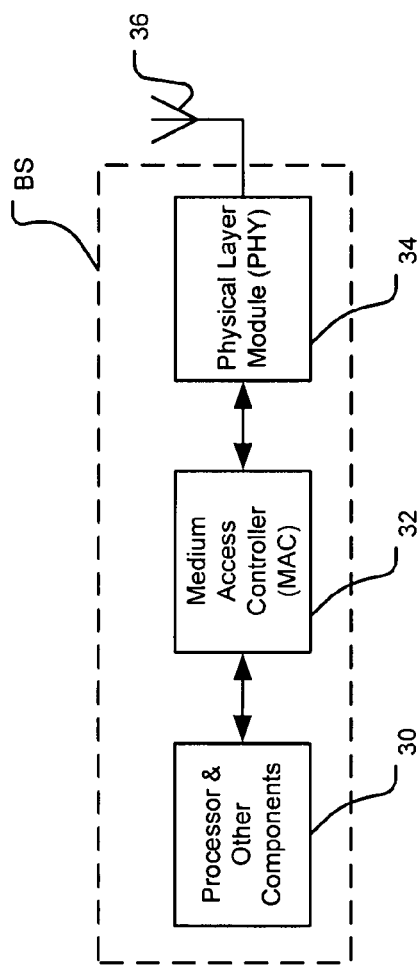
FIG. 2B is a functional block diagram of an exemplary base station utilized in the system of FIG. 2A.
Figure 2C:
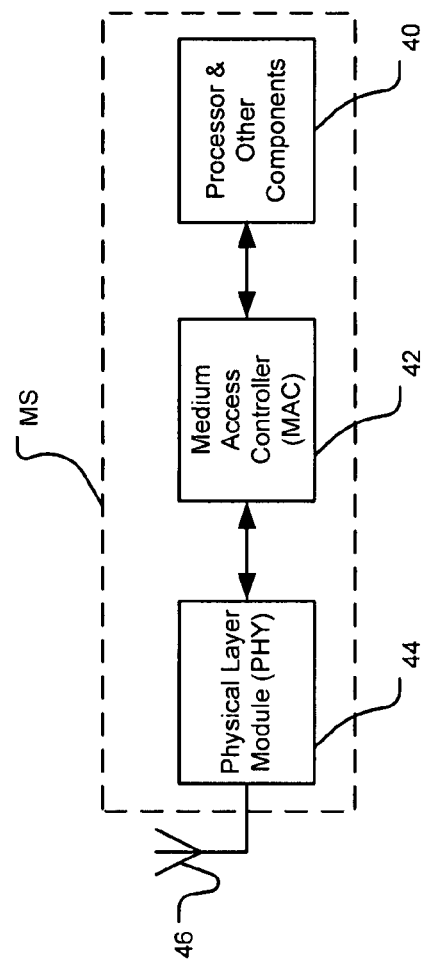
FIG. 2C is a functional block diagram of an exemplary mobile station utilized in the system of FIG. 2A.

The following description is merely exemplary in nature and is in no way intended to limit the disclosure, its application, or uses. For purposes of clarity, the same reference numbers will be used in the drawings to identify similar elements. As used herein, the term module, circuit and/or device refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present disclosure.

Figure 3:
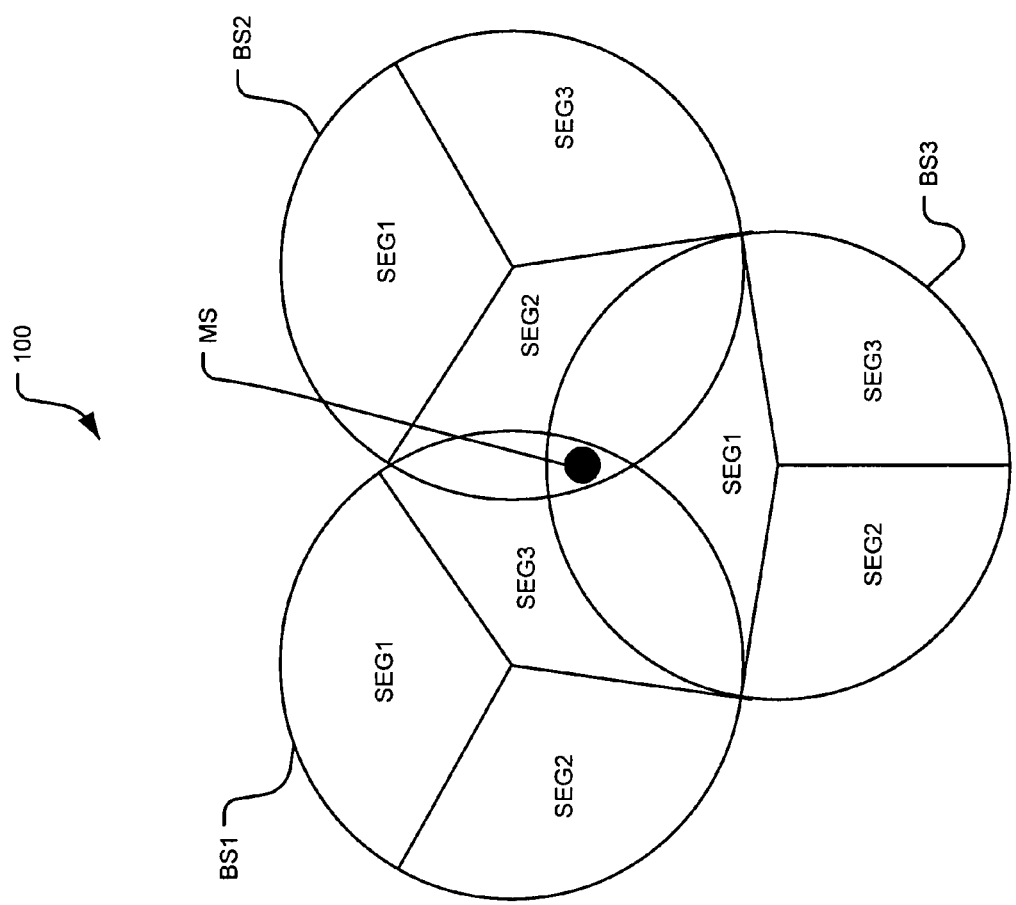
FIG. 3 is a schematic representation of an exemplary wireless communication system comprising three base stations and a mobile station.

Referring now to FIG. 3, a wireless communication system 100 may comprise base stations BS1, BS2, and BS3 (collectively BS) and one or more mobile stations (MS). Generally, one MS may communicate with up to three adjacent base stations. Each BS may transmit data that is modulated using an orthogonal frequency division multiplexing access (OFDMA) system.

Specifically, each BS may transmit data in three segments: SEG1, SEG2, and SEG3. The MS, which may move relative to each BS, may receive data from one or more base stations depending on the location of the MS relative to each BS. For example, the MS may receive data from SEG 3 of BS1, SEG 2 of BS2, and/or SEG 1 of BS3 when the MS is located as shown.

When a receiver in the MS is turned on (i.e., when the MS is powered up), the MS may associate with an appropriate segment of a corresponding BS depending on the location of the MS. The MS, however, can process data in a frame transmitted by a BS only if the MS can correctly detect a preamble sequence in the frame. Specifically, the MS can perform frame synchronization and retrieval of a cell ID (IDcell) and a segment number of the BS from the frame if the MS can detect the preamble sequence in the frame.

Referring now to FIG. 4, OFDMA systems may use 1024 and 512 sub-carriers to modulate and transmit data. OFDMA systems using 1024 and 512 sub-carriers are generally referred to as OFDMA systems having 1024 and 512 FFT modes, respectively. Additionally, I.E.E.E. 802.16e supports 128 FFT and 2048 FFT modes.

A total of 114 preamble sequences exist for OFDMA systems that use fast Fourier transforms (FFT) to modulate 1024 and 512 sub-carriers. Each preamble sequence is unique. That is, each preamble sequence is distinct from another preamble sequence and is identified by an index number. The index number may be referred to as preamble sequence index. Each preamble sequence is 284 and 143 bits long for 1024 and 512 FFT modes, respectively.

Since one MS may typically communicate with up to three base stations, each BS modulates every third sub-carrier. That is, each BS modulates one of every three sub-carriers. Additionally, each BS uses only one bit of the total bits in a preamble sequence when modulating every third sub-carrier. For example, in 1024 FFT mode, the BS may use bit numbers 1, 2, 3, ..., etc., of the 284 bits in a preamble sequence to modulate sub-carrier numbers 1, 4, 7, ..., etc., of the 1024 sub-carriers, respectively.

Each BS may use the same set of sub-carriers. Each segment in a BS, however, uses distinct sub-carriers at least for preamble purposes. For example, for each BS, segment 1 (SEG1) may use sub-carriers 0, 3, 6, 9, ..., etc.; segment 2 (SEG2) may use sub-carriers 1, 4, 7, 10, ..., etc.; and segment 3 (SEG3) may use sub-carriers 2, 5, 8, 11, ..., etc.

Consequently, the MS receives distinct signals from each BS. For example, the MS may receive signals from SEG2 of BS2 on sub-carriers 1, 4, 7, 10, ..., etc., from SEG1 of BS3 on sub-carriers 0, 3, 6, 9, ..., etc., and from SEG 3 of BS1 on sub-carriers 2, 5, 8, 11, ..., etc. Thus, the signals received by the MS may not interfere with each other since their sub-carriers are distinct.

A set of sub-carriers for segment n may be mathematically expressed as follows.

$$\text{PreambleCarrierSet}_n = n + 3k$$

where $0 \leq k \leq 283$ for 1024 FFT mode and $0 \leq k \leq 142$ for 512 FFT mode. Additionally, there may be 86 guard sub-carriers on the left and right ends of the spectrum in 1024 FFT mode. In the 512 FFT mode, there may be 42 guard sub-carriers on the left end and 41 guard sub-carriers on the right end.

Typically, when the receiver in the MS is turned on, the MS initially performs symbol timing and carrier frequency synchronization before the MS can detect a preamble sequence. The MS may perform these tasks using a cyclic prefix in the data frame. Thereafter, the MS determines whether a first symbol in the frame is a preamble symbol. If the first symbol is a preamble symbol, then the MS determines which preamble sequence is present in the frame. Once the MS determines the preamble sequence, the MS can associate with a corresponding segment of an appropriate BS.

Symbols in preamble sequences (i.e., preamble symbols) typically have higher energy than data symbols. For example, the energy of the preamble symbols is typically 8/3 times (i.e., 4.26 dB higher than) the energy of data symbols. This is useful in distinguishing preamble symbols from data symbols.

Additionally, the preamble sequences are almost orthogonal. That is, a cross-correlation between any two preamble sequences is very small. For example, the cross-correlation is typically less than 0.2. This is useful in distinguishing individual preamble sequences from one another. As shown in the table in FIG. 4, if the MS detects a preamble sequence having an index 0, then the MS associates with segment 0 of BS having cell ID 0, and so on.

Base stations and mobile stations may be configured to operate in WiMAX wireless networks. WiMAX is a standards-based technology enabling wireless broadband access as an alternative to wired broadband like cable and DSL. WiMAX provides fixed, nomadic, portable, and mobile wireless connectivity without the need for a direct line-of-sight with a base station. WiMAX technology may be incorporated in portable electronic devices such as notebook computers, personal digital assistants (PDAs), etc.

Mobile WiMAX supports a full range of smart antenna technologies including beamforming, spatial multiplexing, etc., to enhance system performance. Mobile WiMAX supports adaptive switching between these options to maximize the benefit of smart antenna technologies under different channel conditions. Smart antenna technologies typically involve complex vector and matrix operations on signals due to multiple antennas. Typically, base stations may have at least two transmit antennas but may transmit preamble symbols via only one transmit antenna. Mobile stations may have at least two receive antennas and may receive signals via more than one receive antenna.

Referring now to FIGS. 5A-5D, a system 150 for detecting preamble sequences in a mobile station (MS) having at least two receive antennas may be implemented in a physical layer (PHY) module 152 of the MS. The system 150 comprises a correlation module 154 and a control module 156. The correlation module 154 receives input signals transmitted by a base station (BS).

The correlation module 154 receives the input signals via the receive antennas. The input signals received by the receive antennas may be mathematically expressed as follows.

$$Y_1[k] = H_1[k]X_i[k] + Z_1[k]$$
$$\vdots$$
$$Y_R[k] = H_R[k]X_i[k] + Z_R[k]$$

where k is sub-carrier index, i is preamble sequence index, R is total number of receive antennas, and $X_i[k]$ is transmit signal corresponding to preamble sequence index i at sub-carrier k. Additionally, $Y_r[k]$, $H_r[k]$, and $Z_r[k]$ are received signal (i.e., input signal), channel gain, and noise for a receive antenna r at sub-carrier k, respectively. That is, each of R receive antennas receives a separate input signal having separate channel and noise.

When a preamble bit (i.e., a preamble symbol) in a preamble sequence is 0, the corresponding transmit signal $X_i[k]$ is 1. When a preamble bit in a preamble sequence is 1, the corresponding transmit signal $X_i[k]$ is −1. That is, when a preamble bit in a preamble sequence is 1, the channel phase of the sub-carrier in the transmit signal $X_i[k]$ is shifted by $\pi$ relative to the channel phase of the sub-carrier when a preamble bit in a preamble sequence is 0.

The system 150 detects a preamble sequence in the input signals received by the receive antennas as follows. The correlation module 154 correlates the input signals received by the receive antennas with preamble sequences and generates correlation values. The preamble sequences may be stored in memory in the correlation module 154 or the control module 156. Based on the correlation values, the control module 156 initially determines whether a first symbol in the input signals is a preamble symbol or a data symbol. If the first symbol is a preamble symbol, then the control module 156 determines an index i of the preamble sequence. Based on the index i of the preamble sequence detected, the control module 156 determines which segment transmitted the preamble sequence. Accordingly, the MS associates with that segment.

When all k sub-carriers have a common channel gain $H_r$ (i.e., when $H_r[k]$ is independent of k) and the same random channel phase, the k sub-carriers are referred to as "almost flat frequency channels." For almost flat frequency channels, the input signals may be mathematically expressed as follows.

$$Y_r[k]=H_r[k]X_i[k]+Z_r[k] \approx H_r X_i[k]+Z_r[k]$$

Figure 5A:
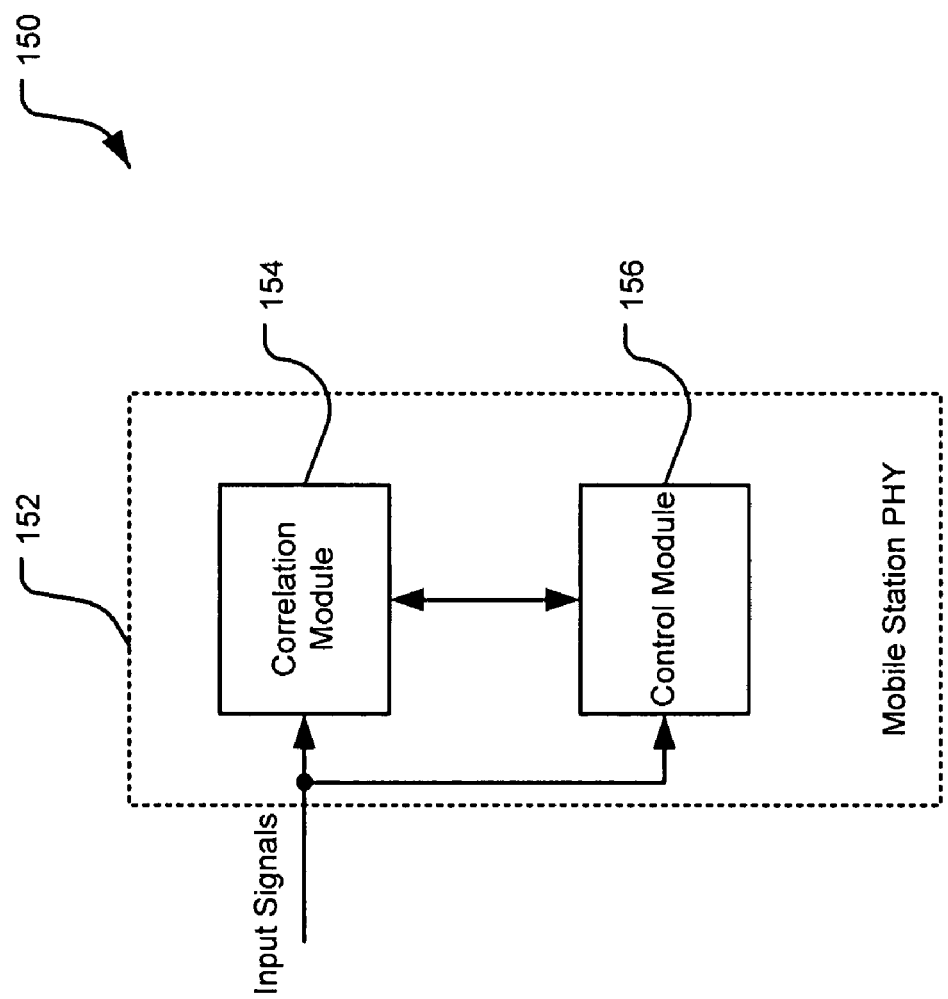
FIG. 5A is a functional block diagram of an exemplary preamble detection system according to the present disclosure.
Figure 5B:
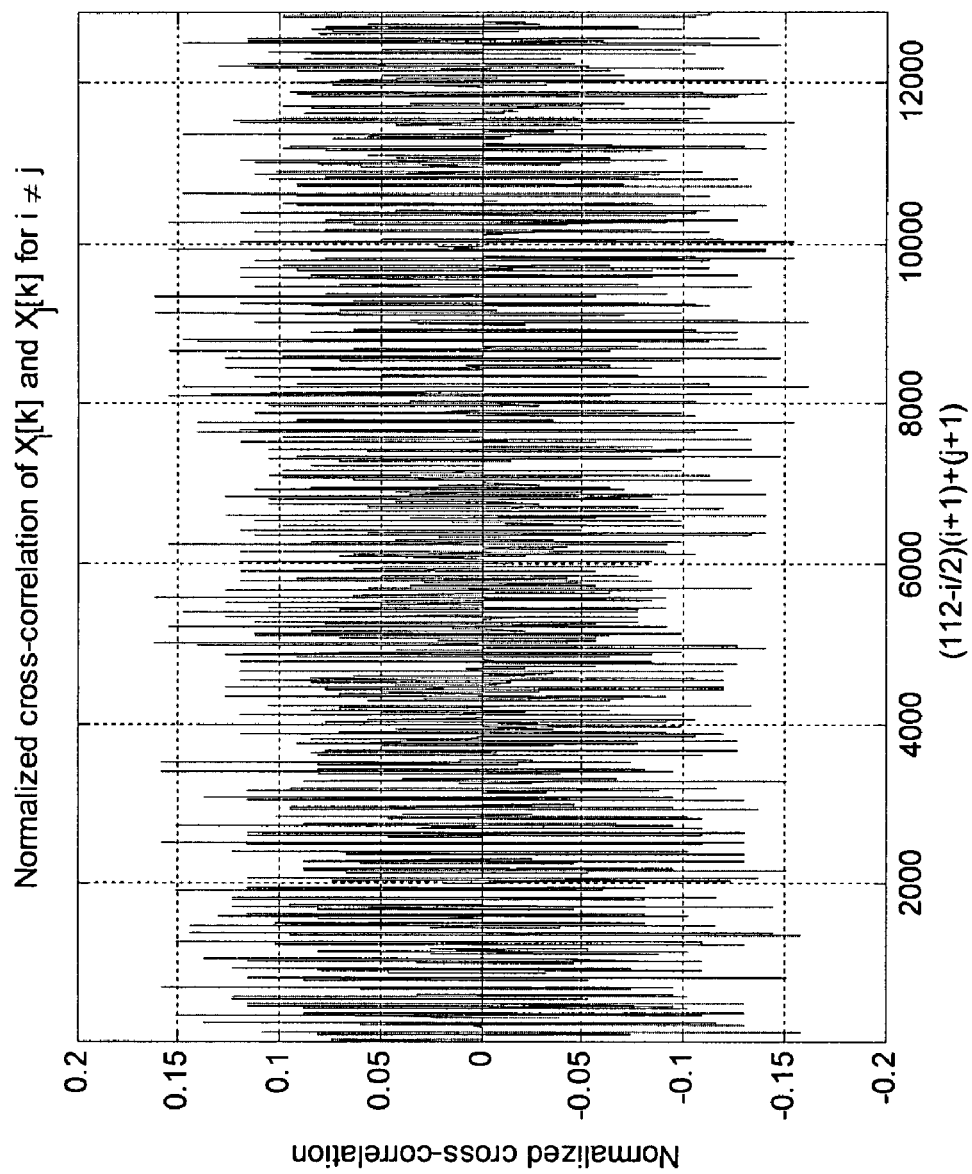
FIG. 5B is a graph showing normalized cross-correlation between preamble sequences of FIG. 4.

A cross-correlation between different preamble sequences is given by the following formula.

$$\max_{i,j \neq i} \left\{ \frac{\left| \sum_{k \in P_{s(i)}} X_i[k] X_j^*[k] \right|}{\sum_{k \in P_{s(i)}} |X_i[k]|^2} \right\} \approx 0.1620 \text{ for 1024 FFT}$$

where Ps=set of pilot sub-carriers for segment s except left most pilot sub-carrier, and s(i)=segment number for a preamble sequence index i. FIG. 5B shows cross-correlation values normalized by $$\sum_{k \in P_{s(0)}} |X_0[k]|^2$$

for 1024 FFT mode.

Since the cross-correlation between different preamble sequences is small, the correlation module 154 correlates the input signal received by each of R receive antennas with all j preamble sequences as follows.

$$C_{j,r} = \sum_{k \in P_{s(j)}} Y_r[k] X_j^*[k]$$

Specifically, the correlation module 154 correlates all modulated sub-carriers in each input signal with each of j preamble sequences. Thus, the correlation module 154 generates j correlation values per receive antenna. For example, in 1024 FFT mode, the correlation module 154 correlates each input signal with each of the 114 preamble sequences and generates 114 correlation values per receive antenna.

The control module 156 adds magnitudes of correlation values of each input signal that correspond to the same preamble sequence, generates j correlation sums, and selects a largest correlation sum from the j correlation sums. This is mathematically expressed as follows.

$$\hat{i} = \arg\max_j \left\{ \sum_{r=1}^{R} |C_{j,r}| \right\}$$

Specifically, the correlation module 154 may generate correlation values $C_{11}, C_{21}, \ldots, C_{j1}$ by correlating j preamble sequences with the input signal received by receive antenna 1, $C_{12}, C_{22}, \ldots, C_{j2}$ by correlating j preamble sequences with the input signal received by receive antenna 2, etc. The control module 156 adds magnitudes of $C_{11}$ and $C_{12}$, $C_{21}$ and $C_{22}, \ldots, C_{j1}$ and $C_{j2}$ and generates correlation sums $C_1, C_2, \ldots, C_j$, respectively.

The control module 156 compares the largest correlation sum to a predetermined threshold. The predetermined threshold is a function of signal strength of the input signals. If the largest correlation sum is greater than or equal to the predetermined threshold, the control module 156 determines that a preamble sequence is detected in the input signals.

Thereafter, the control module 156 determines which segment transmitted the preamble sequence that the control module 156 detected in the input signal. The input signals may be transmitted by up to three different segments of three different base stations. The control module 156 determines which segment transmitted the preamble sequence implicitly when the control module 156 detects the preamble sequence. This is because each preamble sequence is unique as identified by a unique preamble sequence index number, and each segment transmits a unique preamble sequence using distinct sub-carriers.

Thus, when the control module 156 detects the preamble sequence by selecting the largest correlation sum, the control module 156 implicitly selects the segment having maximum channel gain. Thus, when the control module 156 detects the preamble sequence, the control module 156 implicitly detects which segment transmitted the preamble sequence.

Occasionally, the input signals may comprise a carrier frequency offset (CFO). The CFO may be fractional or integer. The CFO in the input signals received by the receive antennas may be approximately the same. In that case, the input signals comprising a fractional CFO p may be mathematically expressed as follows.

$$Y_r[k]=C(\epsilon,0)H_r[k]X_i[k]+I_r(\epsilon,k)+Z_r[k]$$

where $\epsilon=\Delta fNT$ represents normalized CFO.

The fractional CFO introduces Inter-carrier interference (ICI) as given by the following equation.

$$I_r(\varepsilon, k) = \sum_{p=1}^{N-1} C(\varepsilon, p) H_r[((k-p))_N] X_i[((k-p))_N]$$

where N equals total number of sub-carriers (e.g., N=1024 in 1024 FFT mode), and $$C(\varepsilon, p) = \frac{\sin(\pi(\varepsilon - p))}{N \sin(\pi(\varepsilon - p)/N)} e^{j\pi(\varepsilon - p)(1 - 1/N)}$$

Additionally, the fractional CFO decreases signal to noise ratio (SNR) of the input signals. This is mathematically expressed as follows.

$$E[SNR_r(\varepsilon, k)] \approx \frac{|C(\varepsilon, 0)|^2 SNR_{r,0}}{(1 - |C(\varepsilon, 0)|^2) SNR_{r,0} + 1}$$

where $SNR_{r,0}$ represents average SNR of receive antenna r in absence of CFO. SNR decreases as CFO increases.

Since fractional CFO introduces ICI and attenuates the input signals, the fractional CFO adversely affects preamble sequence detection in system 150. The fractional CFO, however, does not affect the preamble sequence detection significantly. This is because the fractional CFO adds a phase error that is common to all sub-carriers and all receive antennas, which does not change the frequency selectivity of the channels.

On the other hand, when the CFO is an integer l, a phase error θ introduced by the integer CFO may be common to all k sub-carriers. Additionally, the integer CFO may be similar in the input signals received by each receive antenna. In that case, the input signals comprising the integer CFO $\tilde{1}$ may be mathematically expressed as follows.

$$Y_r[k] = e^{j\Theta} H_r[((k-\tilde{l}))_N] X_i[((k-\tilde{l}))_N] + Z_r[((k-\tilde{l}))_N]$$

Specifically, the integer CFO causes a cyclic shift of the input signals in the frequency domain. In other words, the integer CFO rotates the input signals in the frequency domain. Accordingly, the correlation module 154 correlates preamble sequences with shifted versions of input signals as given by the following equation.

$$C_{j,r,m} = \sum_{k \in P_{s(j)}} Y_r[((k-m))_N] X_j^*[k]$$

The control module 156 detects a preamble sequence by selecting a maximum correlation value according to the following equation.

$$(\hat{i}, \hat{l}) = \arg\max_{j,m} \left\{ \sum_{r=1}^{R} |C_{j,r,m}| \right\}$$

Figure 5C:
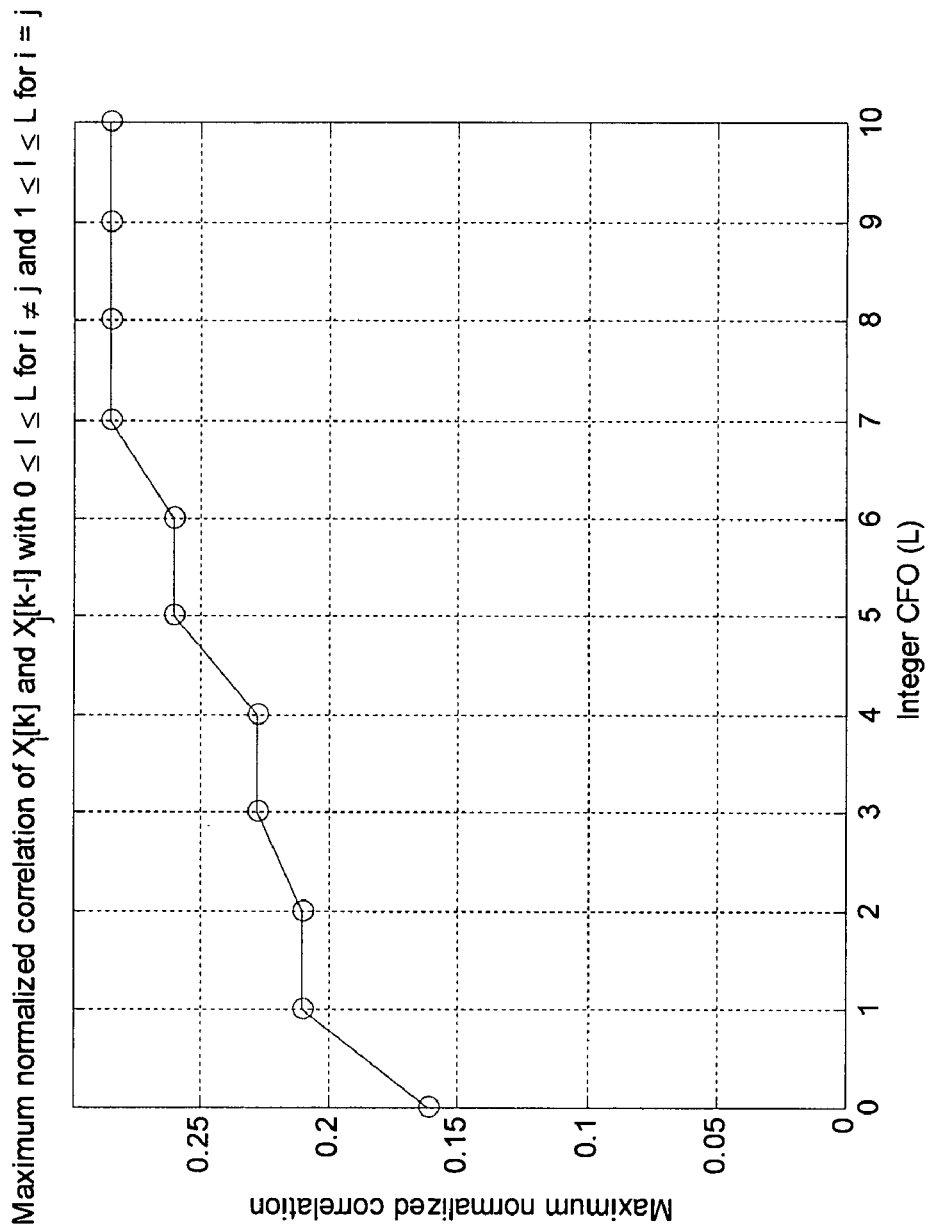
FIG. 5C is a graph showing normalized cross-correlation between preamble sequences of FIG. 4 when integer carrier frequency offset is present.

Simultaneously, the control module 156 also estimates the integer CFO $\hat{1}$. FIG. 5C shows maximum correlation values normalized by $$\sum_{k \in P_{s(0)}} |X_0[k]|^2.$$

Figure 5D:
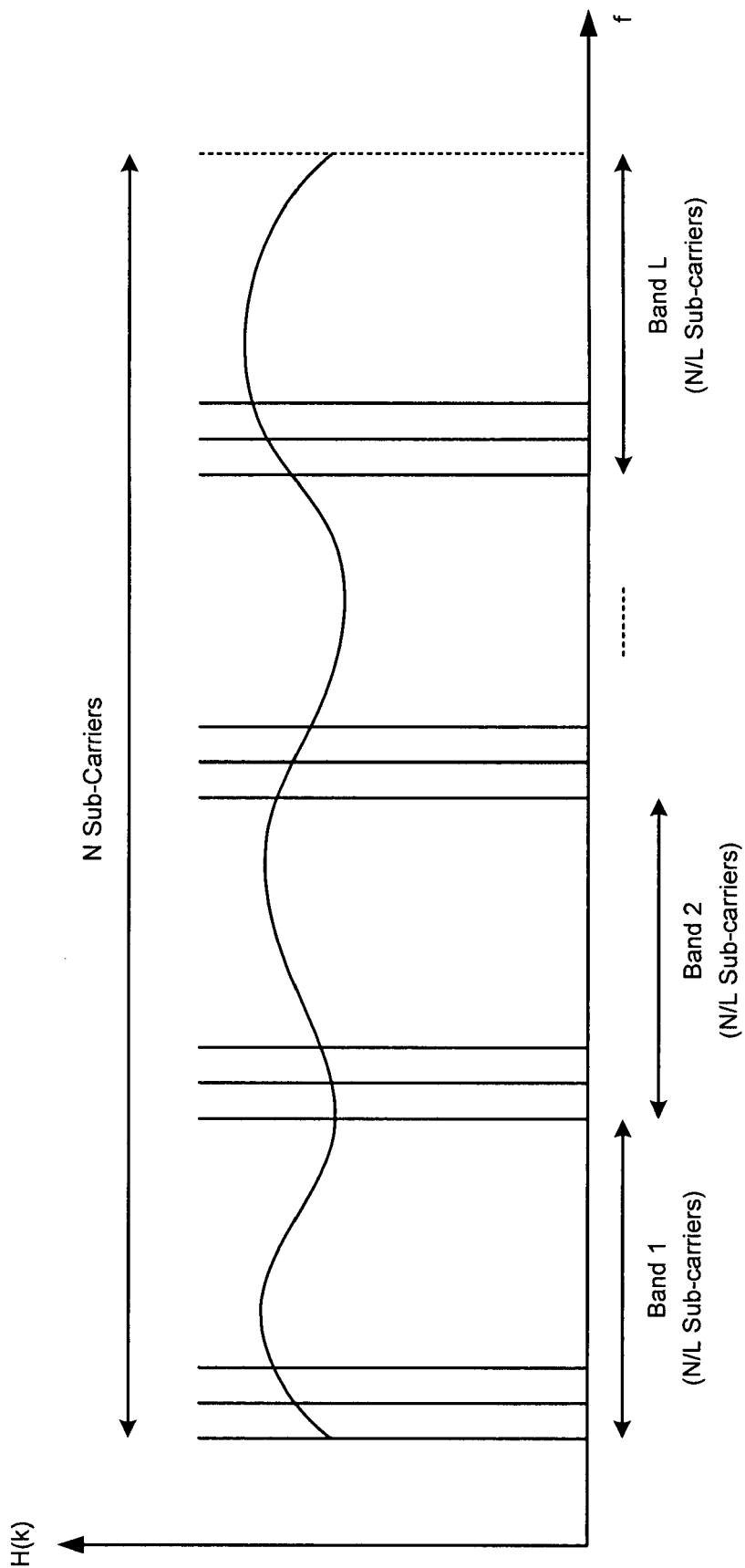
FIG. 5D is a graph showing variation in channel gain relative to sub-carrier frequency in a highly frequency-selective channel.

Occasionally, the channel of each receive antenna may not be almost frequency flat. That is, the sub-carriers in a channel may not have a common channel gain. In other words, $H_r[k]$ may not be independent of k. In that case, the channel gain may vary with frequency of sub-carriers as shown in FIG. 5D. Such a channel is called highly frequency selective channel. In a highly frequency selective channel, the variation in channel gain may significantly change the channel phase of sub-carriers and distort the correlation between transmitted and expected preamble sequences. Consequently, the system 150 may not reliably detect correct preamble sequences by correlating all of the sub-carriers in input signals with the preamble sequences.

However, the system 150 can estimate a preamble sequence index by partitioning channels into bands, wherein the channels may be relatively frequency flat, and then correlating on a per-band basis. Specifically, for each signal received by the receive antennas, the control module 156 partitions the total number of sub-carriers into a predetermined number of bands. If N denotes total number of sub-carriers in a channel, the control module 156 divides the channel into L bands, each comprising N/L consecutive sub-carriers as shown in FIG. 5D. For example, in 1024 FFT mode, the control module 156 may divide the 1024 sub-carriers into 16 bands, each comprising 64 successive sub-carriers. Thus, band 1 may include sub-carriers 1-64, band 2 may include sub-carriers 65-128, . . . , and band 16 may include sub-carriers 961-1024.

Although the channel gain may vary across the bands, the channel gain may not vary significantly among the sub-carriers within individual bands. The correlation module 154 performs correlation on a per-band basis for each receive antenna. That is, the correlation module 154 correlates input signals received by the receive antennas with all the preamble sequences on a per-band basis.

Specifically, the correlation module 154 correlates symbols in a band of an input signal received by a first antenna with corresponding symbols in a preamble sequence and generates correlation values for the band, which may be called intra-band correlation values. The control module 156 adds the intra-band correlation values to generate a sum and generates a magnitude of the sum, which may be called a band correlation value.

Thus for a first preamble sequence, the control module 156 generates L band correlation values. The control module 156 adds the L band correlation values to generate a correlation value $C_{11}$ for the first preamble sequence and the input signal received by the first receive antenna. The correlation module 154 similarly correlates all j preamble sequences with the input signal received by the first receive antenna, and the control module 156 generates j correlation values $C_{11}$, $C_{21}$, . . . , $C_{j1}$.

Correlation values $C_{12}$, $C_{22}$, . . . , $C_{j2}$ are similarly generated by correlating j preamble sequences with the input signal received by antenna 2, etc. The control module 156 adds magnitudes of $C_{11}$ and $C_{12}$, $C_{21}$ and $C_{22}$, . . . , $C_{j1}$ and $C_{j2}$ and generates correlation sums $C_1$, $C_2$, . . . , $C_j$, respectively.

The control module 156 selects a largest of the correlation sums and compares the largest correlation sum to a predetermined threshold, which is a function of signal strength of the input signals. If the largest correlation sum is greater than or equal to the predetermined threshold, the control module 156 determines that a preamble sequence is detected in the input signals. The control module 156 implicitly determines which segment transmitted the input signals based on the detected preamble sequence. The effect of variation in channel gain on the channel phase of sub-carriers and the consequent distortion in correlation is minimized by correlating on a per-band basis and by generating correlation values based on band correlation values, which are magnitudes (i.e., absolute values).

Figure 6A:
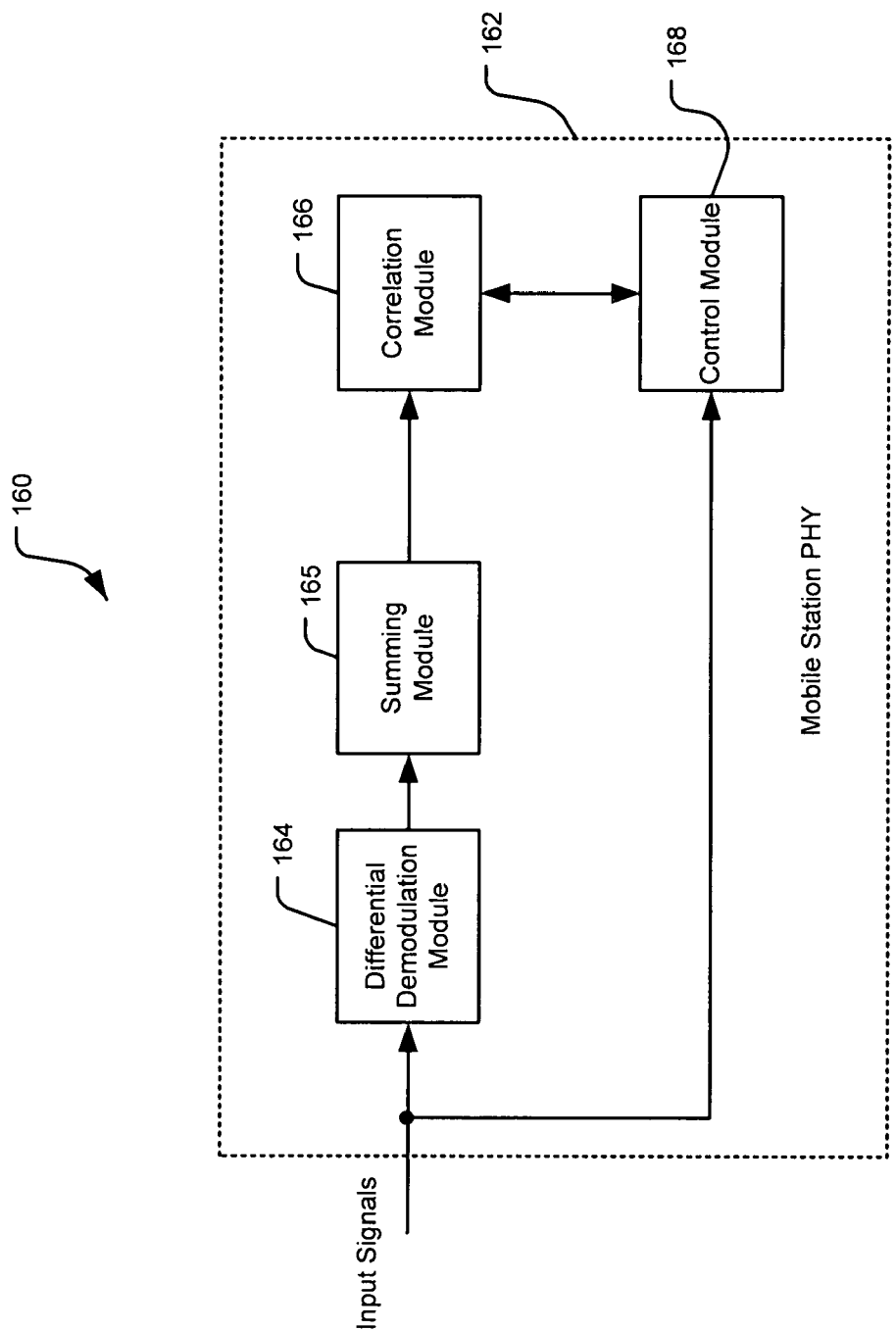
FIG. 6A is a functional block diagram of an exemplary preamble detection system according to the present disclosure.
Figure 6B:
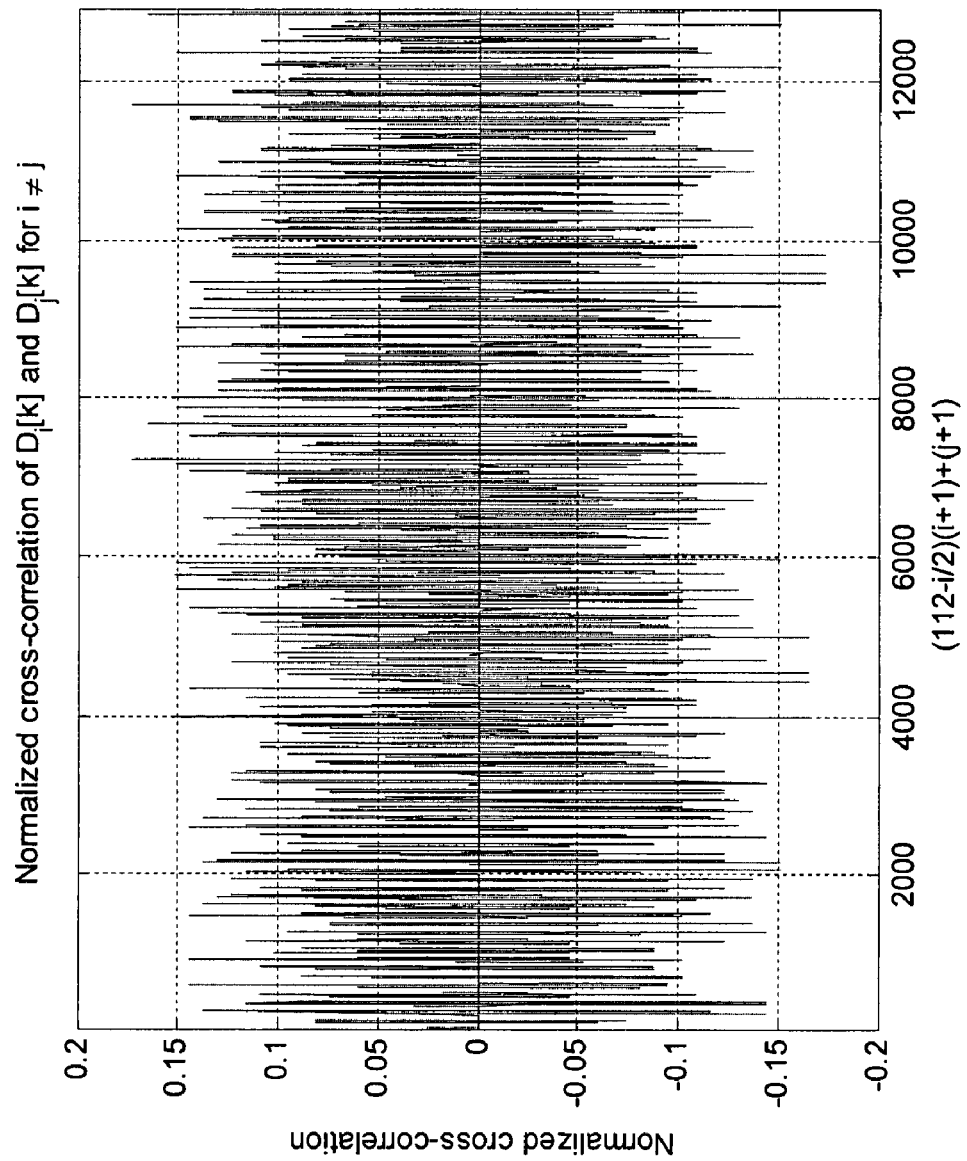
FIG. 6B is a graph showing normalized cross-correlation between preamble sequences derived from the preamble sequences shown in FIG. 4.
Figure 6C:
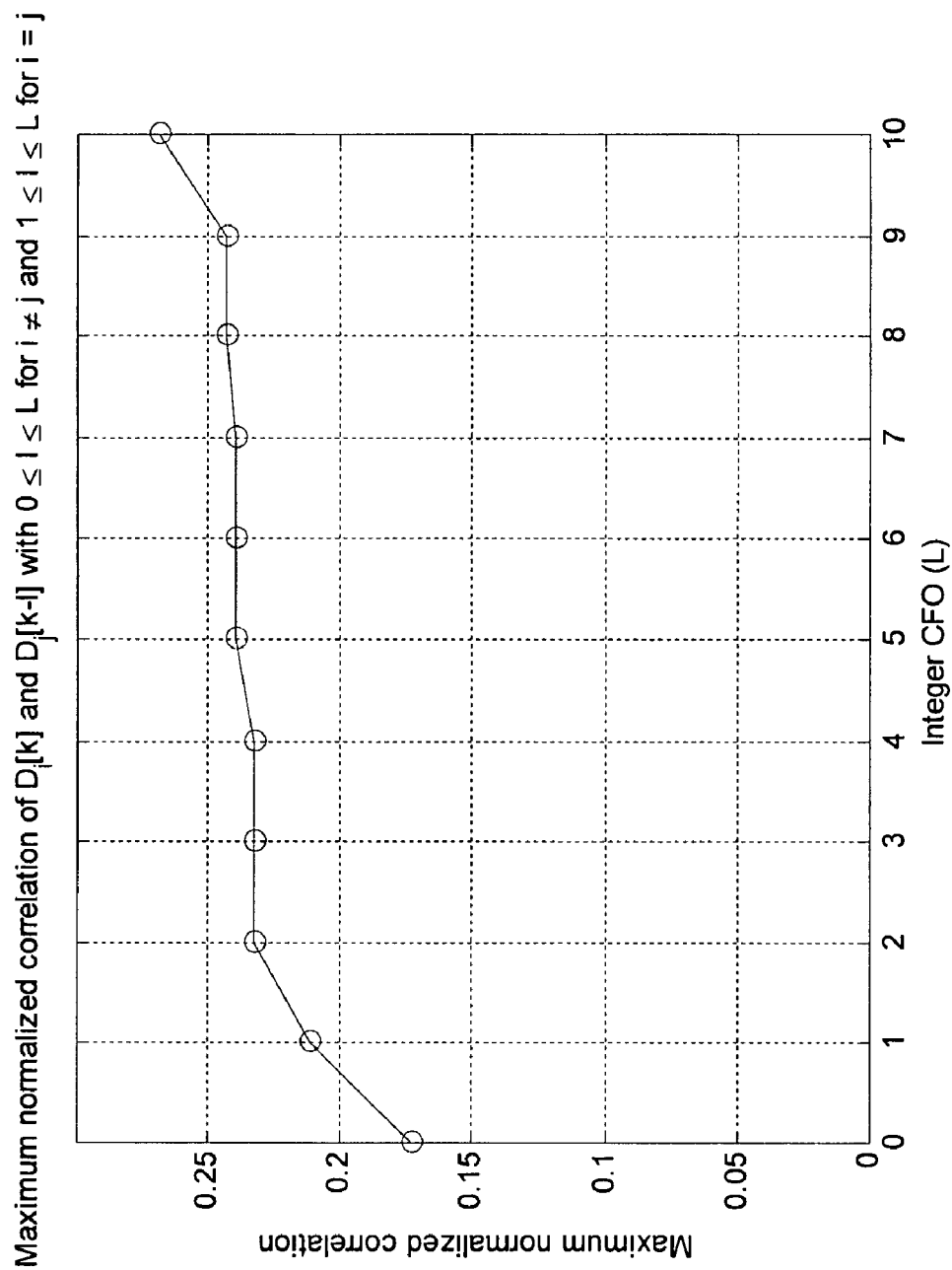
FIG. 6C is a graph showing normalized cross-correlation between derived preamble sequences when integer carrier frequency offset is present.

Referring now to FIGS. 6A-6C, a system 160 for detecting preamble sequences in a mobile station (MS) having at least two receive antennas may be implemented in a physical layer (PHY) module 162 of the MS. The system 160 comprises a differential demodulation module 164, a summing module 165, a correlation module 166, and a control module 168.

The differential demodulation module 164 receives input signals transmitted by a base station (BS). The differential demodulation module 164 receives the input signals via the receive antennas. The input signals received by the receive antennas may be mathematically expressed as follows.

$$Y_1[k] = H_1[k] X_i[k] + Z_1[k]$$
$$\vdots$$
$$Y_R[k] = H_R[k] X_i[k] + Z_R[k]$$

where k is sub-carrier index, i is preamble sequence index, R is number of receive antennas, and $X_i[k]$ is transmit signal corresponding to preamble sequence index i at sub-carrier k. Additionally, $Y_r[k]$, $H_r[k]$, and $Z_r[k]$ are received signal (i.e., input signal), channel gain, and noise for a receive antenna r at sub-carrier k, respectively. That is, each of R receive antennas receives a separate input signal having separate channel and noise.

Adjacent modulated sub-carriers (i.e., sub-carriers 1, 4, 7, etc.) may have similar channel phase or an unknown differential channel phase that is common to all k sub-carriers. The unknown differential channel phase may be caused by presence of a symbol timing offset, which in turn may be caused by improper symbol timing synchronization. When adjacent modulated sub-carriers have similar channel phase, the channel phase difference between adjacent modulated sub-carriers is nearly zero.

On the other hand, when adjacent modulated sub-carriers have an unknown differential channel phase that is common to all k sub-carriers, the channel phase difference between adjacent modulated sub-carriers may be non-zero. When adjacent modulated sub-carriers have similar channel phase or unknown differential channel phase common to all sub-carriers, the sub-carriers are generally referred to as "moderately frequency selective channels."

The differential demodulation module 164 performs a differential demodulation operation on each of the input signals and generates differentially demodulated signals. Specifically, the differential demodulation module 164 multiplies a modulated sub-carrier in an input signal by a complex conjugate of an adjacent modulated sub-carrier located three sub-carriers apart. This operation is called differential demodulation operation.

When the adjacent modulated sub-carriers have similar channel phase, the differentially demodulated signals can be mathematically expressed as follows.

$$M_r[k]=Y_r^*[k-3]Y_r[k]=H_r[k]H_r^*[k-3]D_i[k]+\tilde{Z}_r[k]\approx|H_r[k]H_r^*[k-3]|D_i[k]+\tilde{Z}_r[k]$$

where $Y^*[k-3]$ denotes a complex conjugate of a modulated sub-carrier that is three sub-carriers apart from the modulated sub-carrier $Y[k]$. The complex conjugate is indicated by asterisk or "*".

Since the adjacent modulated sub-carriers have similar channel phase, the channel phase difference between the adjacent modulated sub-carriers is nearly zero. That is, $$\angle(H[k]H^*[k-3])\approx 0$$

The summing module 165 sums the differentially demodulated signals and generates a combined differentially demodulated signal as follows.

$$M[k]=\sum_{r=1}^{R}M_r[k]\approx\left(\sum_{r=1}^{R}|H_r[k]H_r^*[k-3]|\right)D_i[k]+\sum_{r=1}^{R}\tilde{Z}_r[k]$$

The correlation module 166 or the control module 168 stores XOR'ed versions of preamble sequences in memory. XOR'ed versions of preamble sequences may also be referred to as derived preamble sequences. An XOR'ed or derived preamble sequence is generated by XORing adjacent bits in the preamble sequence.

For example, if one of the 114 preamble sequences in 1024 FFT mode includes bits B1, B2, B3, . . . , B284, then an XOR'ed version of that preamble sequence includes bits X1, X2, X3, . . . , X284, where X1=B1⊕B2, X2=B2⊕B3, etc. The derived preamble sequences may be mathematically expressed as follows.

$$D_i[k]=X_i[k]X_i^*[k-3]$$

where the asterisk (i.e., "*") denotes a complex conjugate. Actually performing complex conjugate operations to generate complex conjugates, however, is unnecessary since complex conjugates of 1 and −1 are 1 and −1, respectively. That is, $1^*=1$, and $(-1)^*=-1$.

A cross-correlation between the derived preamble sequences is given by the following formula.

$$\max_{i,j\neq i}\left\{\frac{\sum_{k\in P_{s(i)}}D_i[k]D_j^*[k]}{\sum_{k\in P_{s(i)}}|D_i[k]|^2}\right\}\approx 0.1731\text{ for }1024\text{ }FFT$$

FIG. 6B shows cross-correlation values normalized by $$\sum_{k\in P_{s(0)}}|D_0[k]|^2\text{ for }1024\text{ }FFT$$

mode.

Since the cross-correlation between the derived preamble sequences is small, the correlation module 166 correlates the combined differentially demodulated signal with the derived preamble sequences as follows.

$$C_j=\sum_{k\in P_{s(j)}}M[k]D_j^*[k]$$

The correlation module 166 correlates all k sub-carriers in the combined differentially demodulated signal with each of j derived preamble sequences and generates j correlation values. For example, in the 1024 FFT mode, the correlation module 166 correlates all k sub-carriers with 114 derived preamble sequences and generates 114 correlation values. Since the values of $D_j[k]$ (reference to complex conjugate by "*" omitted) are either 1 or −1, effectively $M[k]D_j[k]=\pm M[k]$.

The correlation values are complex numbers, which have real and imaginary parts. The imaginary parts of the correlation values represent noise in the input signals. The control module 168 disregards the imaginary parts since $\angle(H[k]H^*[k-3])\approx 0$.

The control module 168 selects a correlation value having a largest real part. This is mathematically expressed as follows.

$$\hat{i}=\arg\max_j\{\text{Re}\{C_j\}\}$$

The control module 168 compares the largest real part to a predetermined threshold. The predetermined threshold is a function of signal strength of the input signal. If the largest real part is greater than or equal to the predetermined threshold, the control module 168 determines that a preamble sequence is detected in the input signals. As in system 150, the control module 168 implicitly determines which segment transmitted the preamble sequence when the control module 168 detects the preamble sequence.

On the other hand, when the adjacent modulated sub-carriers have an unknown differential channel phase θ that is common to all k sub-carriers in the input signals, the differentially demodulated signals generated by the differential demodulation module 164 are given by the following equation.

$$M_r[k]=H_r[k]H_r^*[k-3]D_i[k]+\tilde{Z}_r[k]\approx e^{j\theta}|H_r^*[k-3]|D_i[k]+\tilde{Z}_r[k]$$

where $\angle(H[k]H^*[k-3])\approx\theta$ is not zero.

The summing module 165 sums the differentially demodulated signals and generates a combined differentially demodulated signal as follows.

$$M[k] = \sum_{r=1}^{R} M_r[k] \approx e^{j\theta}\left(\sum_{r=1}^{R}|H_r[k]H_r^*[k-3]|\right)D_i[k] + \sum_{r=1}^{R}\tilde{Z}_r[k]$$

Since the cross-correlation between the derived preamble sequences is small, the correlation module 166 correlates the combined differentially demodulated signal with the derived preamble sequences and generates correlation values similar to when the adjacent modulated sub-carriers have similar channel phase. However, because $\angle(H[k]H^*[k-3]) \approx \theta$ is not zero, the control module 168 calculates magnitude of the largest correlation value instead of selecting real part of the largest correlation value. That is, the control module 168 does not disregard the imaginary part of the largest correlation value. This is mathematically expressed as follows.

$$\hat{i} = \arg\max_{j}\{|C_j|\}$$

The control module 168 compares the magnitude of the largest correlation value to a predetermined threshold. The predetermined threshold is a function of signal strength of the input signal. If the magnitude of the largest correlation value is greater than or equal to the predetermined threshold, the control module 168 determines that a preamble sequence is detected in the input signals. As in system 150, the control module 168 implicitly determines which segment transmitted the preamble sequence when detecting the preamble sequence.

As in system 150, the preamble sequence detection in system 160 is not affected by a fractional CFO present in the input signals. When an integer CFO is present in the input signals, the differential demodulation module 164 differentially demodulates the input signals having the integer CFO. The summing module 165 sums the differentially demodulated signals and generates a combined differentially demodulated signal having the integer CFO.

The correlation module 166 correlates derived preamble sequences with the combined differentially demodulated signal having the integer CFO, and the control module 168 performs preamble detection according to the channel phase of adjacent modulated sub-carriers. That is, the control module 168 elects between real part and magnitude of the largest correlation value depending on whether the adjacent modulated sub-carriers have substantially the same channel phase or common unknown differential channel phase. FIG. 6C shows maximum correlation values normalized by $$\sum_{k \in P_{s(0)}} |D_0[k]|^2.$$

Occasionally, the input signals may have a small symbol timing offset due to improper symbol timing synchronization, which is performed when the MS is powered up. The symbol timing offset may cause inter-symbol interference (ISI). Additionally, the symbol timing offset may cause an inter-carrier interference (ICI). The input signals having a symbol timing offset can be mathematically expressed as follows.

$$Y_r[k] = \exp\left(\frac{j2\pi\tau k}{N}\right)H_r[k]X_i[k] + I_r(\tau,k) + Z_r[k]$$

where $\tau$ represents symbol timing offset and $I_r(\tau,k)$ represents ISI and ICI.

Specifically, the symbol timing offset introduces an extra phase offset among the sub-carriers. The phase offset may increase linearly as the sub-carrier index k increases. In that case, system 160 may perform better than system 150. Additionally, the extra phase offset introduced by the symbol timing offset appears in the differentially demodulated signals generated by the differential demodulation module 164 and the combined differentially demodulated signal generated by the summing module 165. Therefore, the system 160 using the largest magnitude of the correlation value to detect a preamble sequence may perform better than the system 160 utilizing the largest real part of the correlation value to detect the preamble sequence.

The differentially demodulated signals with the extra phase offset are mathematically expressed as follows.

$$M_r[k] = \exp\left(\frac{j6\pi\tau}{N}\right)H_r[k]H_r^*[k-3]D_i[k] + Z'_r[k]$$

If the linearly increasing phase offset is too large, the control module 168 calculates the magnitude of the largest correlation value instead of selecting a largest real part of a correlation value.

In the system 160 utilizing magnitude of the largest correlation value to detect a preamble sequence, the control module 168 simultaneously estimates symbol timing offset as follows. After calculating the magnitude of the largest correlation value, the control module 168 measures a phase of the correlation value having the largest magnitude. The control module 168 calculates symbol timing offset by multiplying the phase of the correlation value having the largest magnitude by a ratio of N to $3*2\pi$. Mathematically, this may be expressed as follows.

$$C_j = \sum_{k \in P_{s(j)}} M[k]D_j^*[k]$$

$$\hat{i} = \arg\max_{j}\{|C_j|\}$$

$$\hat{\tau} = \frac{N}{6\pi}\angle C_{\hat{i}}$$

where $\angle C_{\hat{i}}$ is the phase angle of the correlation value having the largest magnitude, and N is total number of sub-carriers in an FFT mode (e.g., N=1024 in 1024 FFT mode). Additionally, multiplier 3 is used to multiply $2\pi$ since every third sub-carrier is modulated. Thus, the multiplier may be P when every $P^{th}$ sub-carrier is modulated, where P is an integer greater than or equal to 1.

Figure 7A:
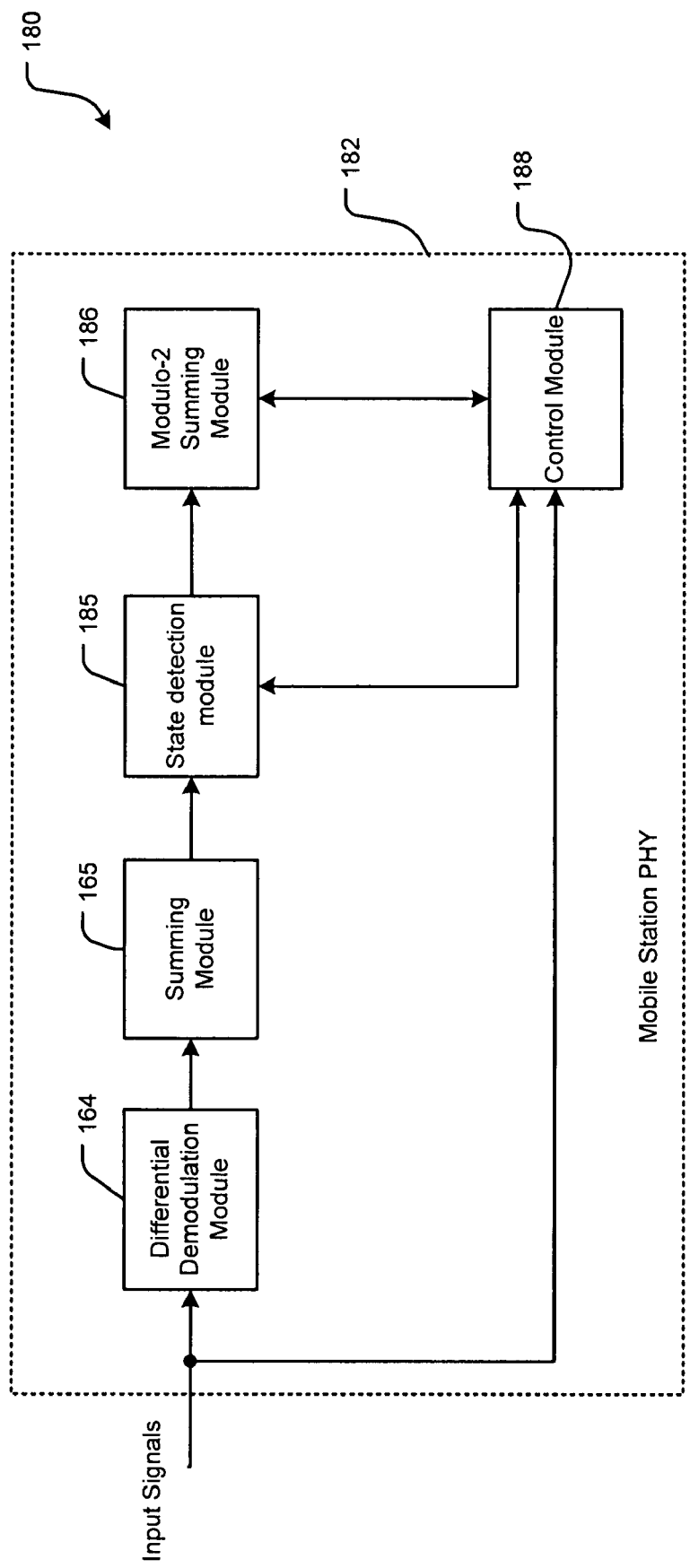
FIG. 7A is a functional block diagram of an exemplary preamble detection system according to the present disclosure.
Figure 7B:
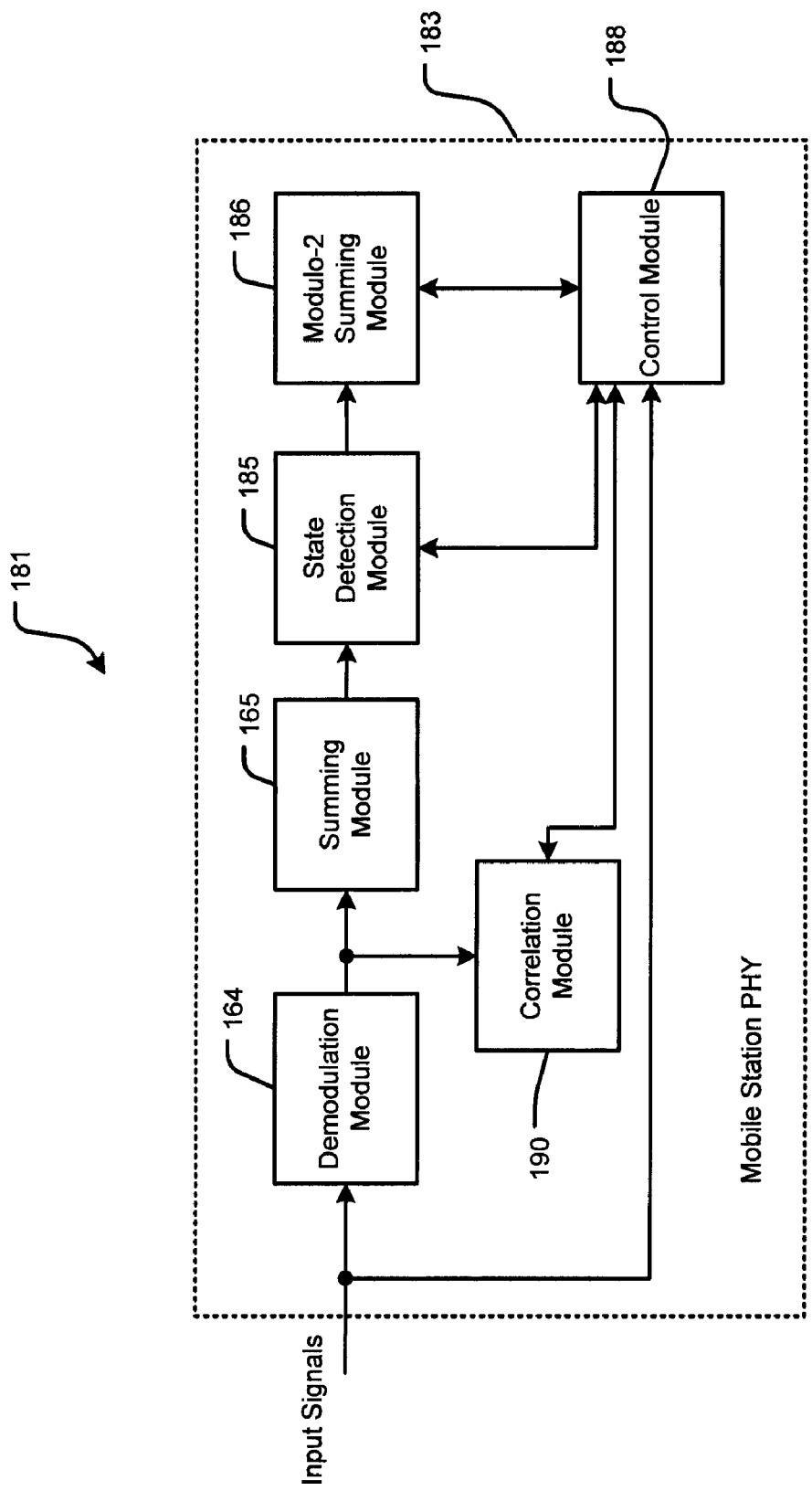
FIG. 7B is a functional block diagram of an exemplary segment selection system according to the present disclosure.

Referring now to FIGS. 7A-7C, a system 180 for detecting preamble sequences in a mobile station (MS) having at least two receive antennas may be implemented in a physical layer (PHY) module 182 of the MS. The system 180 comprises a differential demodulation module 164, a summing module 165, a state detection module 185, a modulo-2 summing module 186, and a control module 188 as shown in FIG. 7A.

The differential demodulation module 164 receives input signals transmitted by a base station (BS). The differential demodulation module 164 receives the input signals received via at least two receive antennas. The input signals may be mathematically expressed as follows.

$$Y_1[k] = H_1[k]X_i[k] + Z_1[k]$$
$$\vdots$$
$$Y_R[k] = H_R[k]X_i[k] + Z_R[k]$$

where k is sub-carrier index, i is preamble sequence index, R is number of receive antennas, and $X_i[k]$ is transmit signal corresponding to preamble sequence index i at sub-carrier k. Additionally, $Y_r[k]$, $H_r[k]$, and $Z_r[k]$ are received signal (i.e., input signal), channel gain, and noise for a receive antenna r at sub-carrier k, respectively. That is, each of R receive antennas receives a separate input signal having separate channel and noise.

The differential demodulation module 164 performs a differential demodulation operation on the input signals and generates differentially demodulated signals. Specifically, the differential demodulation module 164 multiplies a modulated sub-carrier in an input signal by a complex conjugate of an adjacent modulated sub-carrier located three sub-carriers apart.

When the adjacent modulated sub-carriers have similar channel phase (i.e., when $\angle(H[k]H^*[k-3])\approx 0$), the differentially demodulated signals can be mathematically expressed as follows.

$$M_r[k]=Y_r^*[k-3]Y_r[k]=H_r[k]H_r^*[k-3]D_i[k]+\tilde{Z}_r[k]\approx |H_r[k]H_r^*[k-3]|D_i[k]+\tilde{Z}_r[k]$$

where $Y^*[k-3]$ denotes a complex conjugate of a modulated sub-carrier that is three sub-carriers apart from the modulated sub-carrier $Y[k]$. The complex conjugate is indicated by asterisk or "*". Additionally, XOR'ed versions of preamble sequences, called derived preamble sequences, are expressed by the following equation.

$$D_i[k]=X_i[k]X_i^*[k-3]$$

The derived preamble sequences have a very low cross-correlation (e.g., 0.1731 for 1024 FFT) and may be stored in the control module 188.

For moderately frequency selective channels with high signal-to-noise ratio (SNR), $$\tilde{Z}[k]<<|H[k]H^*[k-3]|D_i[k].$$

Thus, the differentially demodulated signals can be represented by the following equation.

$$M_r[k]=H_r[k]H_r^*[k-3]D_i[k]+\tilde{Z}_r[k]\approx |H_r[k]H_r^*[k-3]|D_i[k]$$

The summing module 165 sums the differentially demodulated signals and generates a combined differentially demodulated signal as follows.

$$M[k] = \sum_{r=1}^{R} M_r[k] \approx \left(\sum_{r=1}^{R} |H_r[k]H_r^*[k-3]|\right)D_i[k]$$

The sign of the real part of $M[k]$ is the same as the sign of $D_i[k]$ in absence of noise and when $\angle(H[k]H^*[k-3])\approx 0$. That is, when $D_i[k]=1$, $M[k]$ is positive or +1, and when $D_i[k]=0$, $M[k]$ is negative or −1. This may be mathematically expressed as follows.

$$u(Re\{M[k]\})=u(Re\{D_i[k]\})$$

where u represents the sign and $Re\{M[k]\}$ and $Re\{D_i[k]\}$ represent real parts of $M[k]$ and $D_i[k]$, respectively. Thus, $$u(x) = \begin{cases} 1 & \text{for } x \geq 0 \\ 0 & \text{for } x < 0 \end{cases}$$

That is, positive values of real part (e.g., x=+1) represent binary 1s, and negative values of real part (e.g., x=−1) represent binary 0s. Hereinafter, the word "sign" may be used interchangeably with (i.e., synonymously as) "state" and/or "polarity."

Signs or states of $M[k]$ and $D_i[k]$ may be used to simplify implementation of preamble detection as follows. Instead of performing a complex operation of calculating correlation values between $M[k]$ and $D_i[k]$, a preamble sequence may be detected by performing XOR operations on (i.e., modulo 2 sums of) signs or states of real parts of $M[k]$ and $D_i[k]$. The XOR operations generate values that are equivalent to correlation values generated by performing correlation of $M[k]$ and $D_i[k]$ using a correlation module.

Since XOR operations are simpler to implement than implementing correlation operations, the XOR operations will be hereinafter referred to as low-complexity cross-correlation. Consequently, values generated by the XOR operations will be hereinafter referred to as low-complexity cross-correlation values or cross-correlation values.

The state detection module 185 detects the states or signs of symbols in $M[k]$. The modulo-2 summing module 186 generates the cross-correlation values for each preamble sequence as follows.

$$\tilde{C}_j = \sum_{k \in P_{s(j)}} u(Re\{M[k]\}) \oplus (1 - u(D_j[k]))$$

where Ps=set of pilot sub-carriers for segment s except left most pilot sub-carrier, and s(j)=segment number for a preamble sequence index j. $u(Re\{M[k]\})$ are the signs or states of the real parts of symbols in $M[k]$, and $u(D_j[k])$ are the signs or states of the derived preamble sequences. Since the states of $M[k]$ and $D_j[k]$ are identical, the XOR of states of $M[k]$ and $D_j[k]$ would be zero. Therefore, instead of using states of $(D_j[k])$, the modulo-2 summing module 186 uses states $(1-u(D_j[k]))$, which are opposite of states of $(D_j[k])$. That is, $(1-u(D_j[k]))$ is essentially the same as inverted $u(D_j[k])$.

For example, if sequence $D_j[k]$ is 10110, then $(1-u(D_j[k]))$ is 01001. Thus, if received sequence in $M[k]$ is the same as the transmitted sequence, the value of the sum $C_j$ (i.e., the cross-correlation value) would be 5. On the other hand, if the received sequence is different from 10110, the value of the sum $C_j$ would be less than 5. Stated generally, the cross-correlation value will be largest when a received sequence in the differentially demodulated signal $M[k]$ matches one of differentially demodulated preamble sequences $D_j[k]$.

For simplicity, $(1-u(D_j[k]))$ may be hereinafter referred to as predetermined states of preamble sequences. The control module 188 may store the predetermined states $(1-u(D_j[k]))$ for all preamble sequences. Thus, the state detection module 185 does not have to detect the predetermined states of preamble sequences, and the modulo-2 summing module 186 may read the predetermined states of preamble sequences directly from the control module 188 when performing cross-correlation.

The control module 188 estimates a preamble sequence index i from the cross-correlation values generated by the modulo-2 summing module 186 as follows. The control module 188 selects the preamble sequence index for which the cross-correlation value with the differentially demodulated signal is largest. This may be mathematically expressed as follows.

$$\hat{i} = \arg\max_j \{\tilde{C}_j\}$$

The control module 188 determines that a preamble sequence is detected if the magnitude of the largest cross-correlation value is greater than or equal to a predetermined threshold. The predetermined threshold may be based on the strength of the input signal.

Although the system 180 utilizes low-complexity cross-correlation by performing XOR operations instead of actual correlation operations to detect a preamble sequence, the system 180 may reliably detect the preamble sequence. That is, the system 180 may not mis-detect or fail to detect a preamble sequence. This is because of two reasons: First, the pilot sub-carriers for preamble sequences have higher SNRs than regular data sub-carriers since the pilot sub-carriers have approximately 9 dB higher energy than regular data sub-carriers. This helps in distinguishing a preamble symbol from a data symbol and in detecting the preamble symbol, thereby reducing probability of mis-detection or detection failure.

Second, the preamble sequences have high redundancy, which may help in increasing the accuracy with which preamble sequences may be detected despite using XOR operations instead of actual correlation operations. Specifically, in 1024 FFT mode, less than 7 bits would be sufficient to represent 114 preamble sequences (since $2^7=128$, which is more than 114). Additionally, each preamble sequence is 284-bits long wherein 7 bits are encoded to represent 284 symbols, thereby leaving many bits redundant.

The control module 188 determines which segment transmitted the detected preamble sequence implicitly when the control module 188 detects the preamble sequence. This is because each preamble sequence is unique as identified by a unique preamble sequence index number, and each segment transmits a unique preamble sequence using distinct sub-carriers. When the control module 188 detects the preamble sequence by selecting the largest cross-correlation value, the control module 188 implicitly selects the segment having the largest channel gain (i.e., the best segment).

Occasionally, two or more preamble sequences may generate cross-correlation values that are larger than the rest and that are approximately the same. For example, when a mobile station is adjacent to a cell boundary or a segment boundary, the mobile station may receive input signals including preamble sequences from adjacent base stations.

Thus the input signals received by the mobile station at cell or segment boundaries may be a sum of up to three signals that may be transmitted by three different segments of three different base stations. This is mathematically expressed as follows.

$$Y_r[k] = \sum_{s=0}^{2} H_{r,s}[k] X_{i,(s)}[k] + Z_r[k]$$

where
i(s)=preamble sequence index used for segment s,
$H_{r,s}[k]$=preamble OFDMA symbol of segment s, and
$X_{i(s)}[k]$=channel gain corresponding to the segment s and receive antenna r.

In that case, the modulo-2 summing module 186 may generate cross-correlation values that are similar and larger than the rest due to presence of two or more preamble sequences in the received signals. Subsequently, the control module 188 may detect two or more cross-correlation values that are similar and that are larger than the rest of the cross-correlation values.

Consequently, when using low-complexity cross-correlation, the best segment determined by the control module 188 may or may not in fact be the best segment depending on the channel gain and noise. For example, when channel gain $H_r[k]$ is very high, say 10, and noise $Z_r[k]$ is very low, say 0.1, the probability may be very high that the sign of $Y_r[k]$ may be positive for a binary 0 and negative for a binary 1. In that case, the best segment determined by the control module 188 may in fact be the best segment.

On the other hand, when $H_r[k]$ is very low, say only 1, the signs of $Y_r[k]$ may still be positive and negative for 0s and 1s, respectively. However, when the channel gain is very low and the noise level is high, the signs of $Y_r[k]$ may not be positive and negative for 1s and 0s, respectively. That is, high noise levels may invert the sign of $Y_r[k]$ when channel gain is very low. Sign inversions due to low channel gain and/or high noise may affect the ability of the control module 188 to accurately select the segment since the low-complexity cross-correlation is based on signs of M[k] and D[k].

When two or more cross-correlation values are similar and larger than the rest, the control module 188 may select the correct segment in three ways. In one way, the control module 188 may randomly select one of the two or more larger cross-correlation values. Thus, the control module 188 may select the segment that corresponds to the preamble sequence that yielded the randomly selected larger cross-correlation value.

In another way, the control module 188 may select one of the two or more larger cross-correlation values based on the strength of the input signals. That is, the control module 188 may select the larger cross-correlation value that corresponds to the strongest input signal. This may be mathematically expressed as follows.

$$\hat{s} = \arg\max_s \left\{ \sum_{r=1}^{R} \sum_{k \in P_s} |Y_r[k]| \right\}$$

The control module 188 may accurately select the segment based on input signal strength when the noise level is approximately the same for all input signals received from different segments.

In yet another way, the system 180 may include a correlation module 190 that correlates the differentially demodulated input signals and the derived preamble sequences that generated the two or more larger and similar cross-correlation values. An example of such a system 181 implemented in a PHY module 183 of a mobile station having at least two receive antennas is shown in FIG. 7B. Hereinafter, the differentially demodulated input signals and the derived preamble sequences that generated the two or more larger and similar cross-correlation values will be called selected input signals and selected preamble sequences, respectively.

The correlation module 190 correlates the selected input signals with the selected preamble sequences, generates correlation values, and outputs the correlation values to the control module 188. The correlation values are complex numbers, which have real and imaginary parts. The imaginary parts of the correlation values represent noise in the input signal.

When $\angle(H[k]H^*[k-3]) \approx 0$, i.e., when adjacent modulated sub-carriers have similar channel phase, the control module 188 disregards the imaginary parts and selects a correlation value having a largest real part. The control module 188 selects the segment that corresponds to the preamble sequence that generated the correlation value having the largest real part.

On the other hand, when the adjacent modulated sub-carriers have an unknown differential channel phase $\theta$ common to all k sub-carriers, the control module 188 calculates the magnitude of the largest correlation value instead of selecting the real part of the largest correlation value. That is, the control module 188 does not disregard the imaginary part of the largest correlation value. The control module 188 selects the segment that corresponds to the preamble sequence that generated the correlation value having the largest magnitude.

Figure 8A:
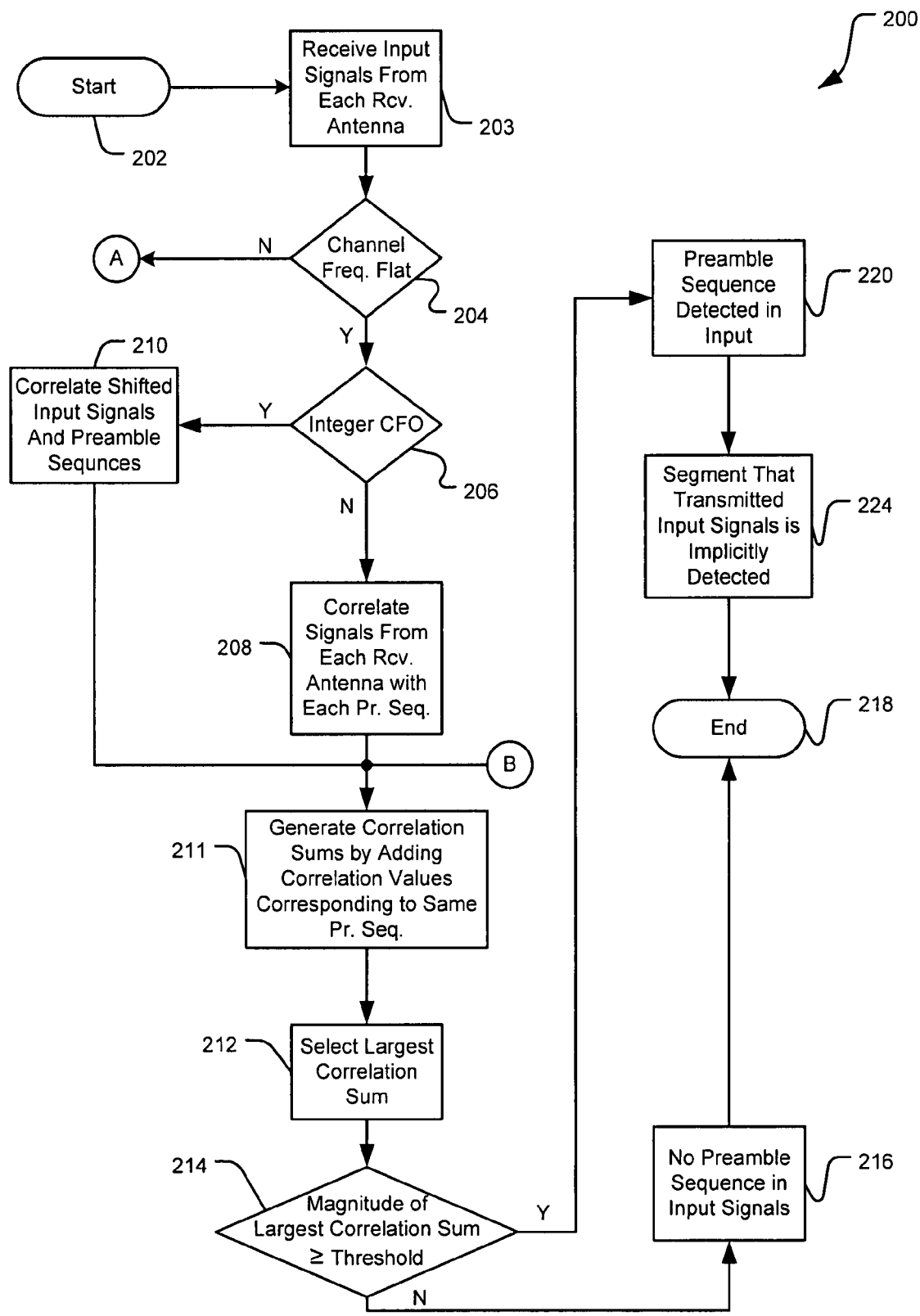
FIGS. 8A-8B depict a flowchart of an exemplary method for detecting preamble sequences according to the present disclosure.
Figure 8B:
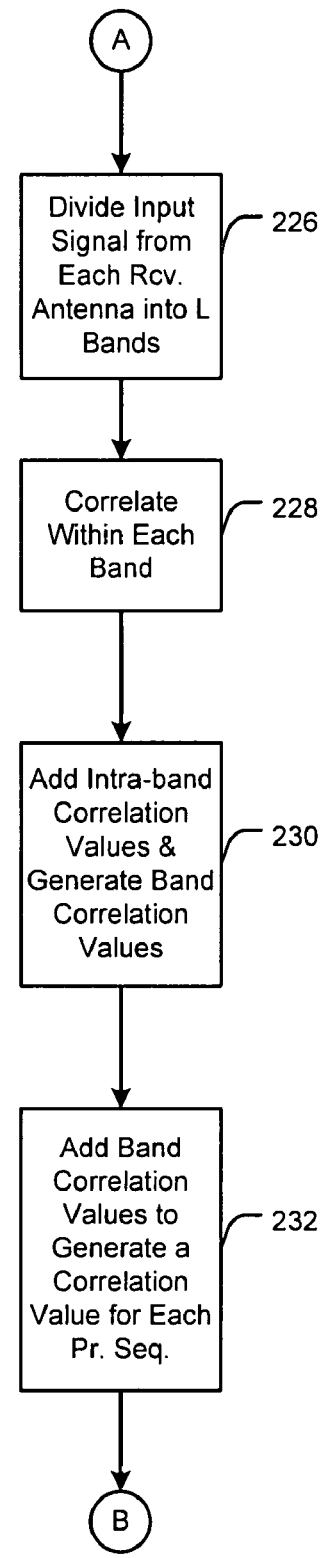

Referring now to FIGS. 8A-8B, a method 200 for detecting preamble sequences in a mobile station having at least two receive antennas begins at step 202. In step 203, a correlation module 154 receives an input signal from each receive antenna wherein each input signal includes sub-carriers that are modulated using orthogonal frequency division multiplexing (OFDM). In step 204, a control module 156 determines whether channels are almost frequency flat.

If true, the control module 156 determines in step 206 if an integer carrier frequency offset (CFO) is present in the input signal. If the integer CFO is absent, the correlation module 154 correlates the input signal from each receive antenna with all preamble sequences in step 208 and generates correlation values for each input signal. If the integer CFO is present, however, the correlation module 154 correlates the signals shifted by the integer CFO with preamble sequences in step 210.

In step 211, the control module 156 adds correlation values that correspond to the same preamble sequence for each input signal to generate correlation sums. The control module 156 selects a largest of the correlation sums in step 212. The control module 156 checks if a magnitude of the largest correlation sum exceeds a predetermined threshold in step 214. If false, the control module 156 determines in step 216 that no preamble sequence is detected in the input signals, and the method 200 ends in step 218.

If true, however, the control module 156 determines that a preamble sequence is detected in the input signals in step 220. Since each preamble sequence is unique and since each segment of each base station transmits using distinct sub-carriers, the control module 156 implicitly determines in step 224 which segment of a base station transmitted the detected preamble sequence. The method 200 ends in step 218.

If, however, the result of step 204 is false, the control module 156 divides the input signal received by each receive antenna into L bands in step 226. The correlation module 154 correlates on a per-band basis and generates intra-band correlation values for each input signal in step 228. The control module 156 adds the intra-band correlation values and generates a magnitude of a sum of the intra-band correlation values to generate a band correlation value in step 230, thereby generating L band correlation values for each preamble sequence per receive antenna.

The control module 156 adds the band correlation values for a preamble sequence to generate a correlation value for the preamble sequence in step 232, thereby generating i correlation values for i preamble sequences for each input signal in step 232. Steps starting at step 211 are performed thereafter.

Figure 9A:
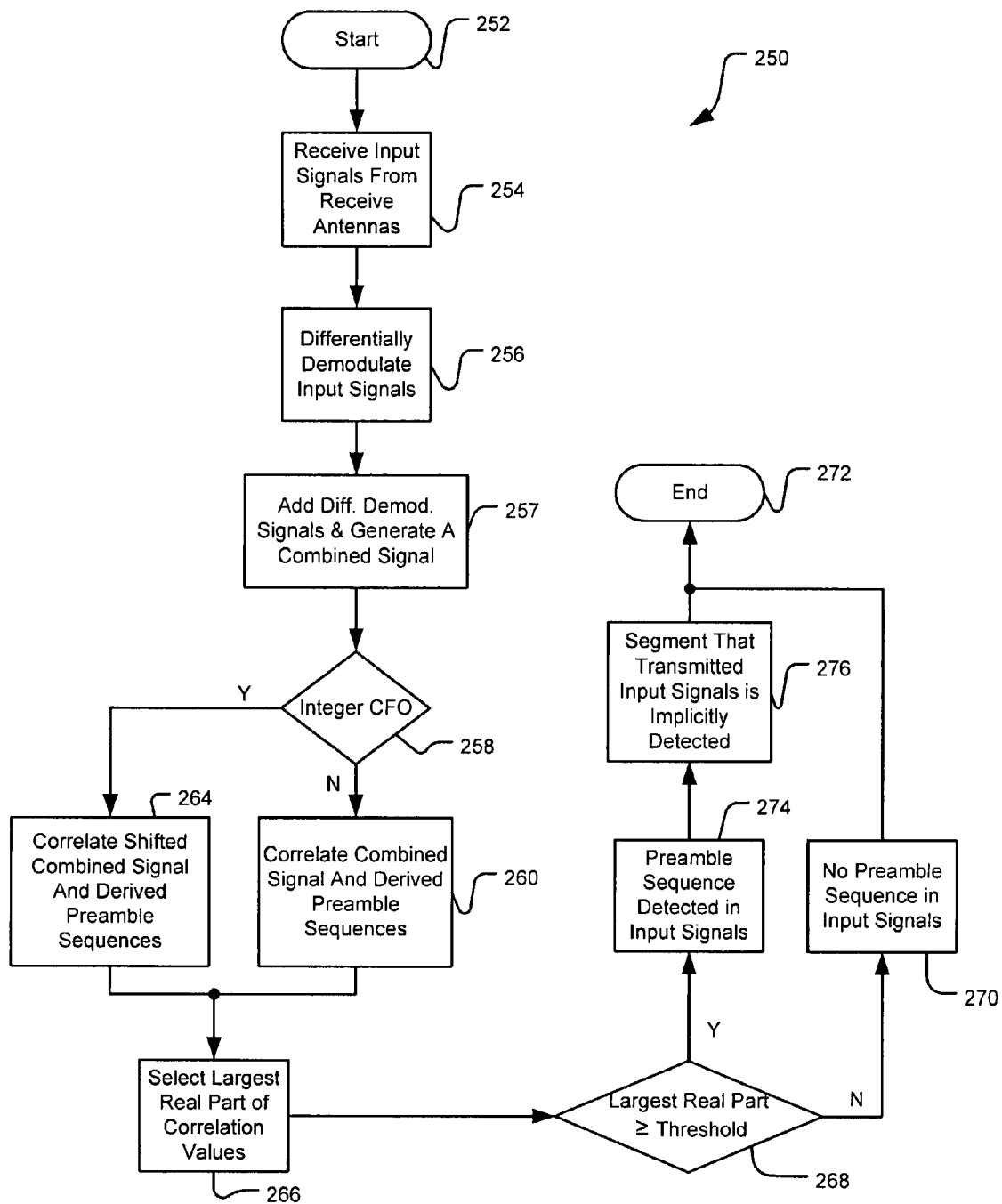
FIG. 9A is a flowchart of an exemplary method for detecting preamble sequences when sub-carriers have substantially similar channel phase.

Referring now to FIG. 9A, a method 250 for detecting preamble sequences in signals received by a MS via at least two receive antennas when moderately frequency selective channels have substantially the same channel phase begins at step 252. A differential demodulation module 164 receives an input signal from each receive antenna in step 254 wherein each input signal includes sub-carriers that are modulated using orthogonal frequency division multiplexing (OFDM).

The differential demodulation module 164 differentially demodulates the input signals and generates differentially demodulated signals in step 256. A summing module 165 adds the differentially demodulated signals and generates a combined differentially demodulated signal in step 257.

A control module 168 determines in step 258 if an integer carrier frequency offset (CFO) is present in the input signals. If the integer CFO is absent, a correlation module 166 correlates the combined differentially demodulated signal with derived preamble sequences and generates correlation values in step 260. If the integer CFO is present, however, the correlation module 166 correlates in step 264 the derived preamble sequences with the combined differentially demodulated signal that includes a shift caused by the integer CFO.

The control module 168 selects in step 266 a largest real part of correlation values generated by the correlation module 166. The control module 168 checks if the largest real part is greater than or equal to a predetermined threshold in step 268. If false, the control module 168 determines in step 270 that no preamble sequence is detected in the input signals, and the method 250 ends in step 272.

If true, however, the control module 168 determines that a preamble sequence is detected in the input signals in step 274. Since each preamble sequence is unique and since each segment of each base station transmits using distinct sub-carriers, the control module 168 implicitly determines in step 276 which segment of a base station transmitted the detected preamble sequence. The method 250 ends in step 272.

Figure 9B:
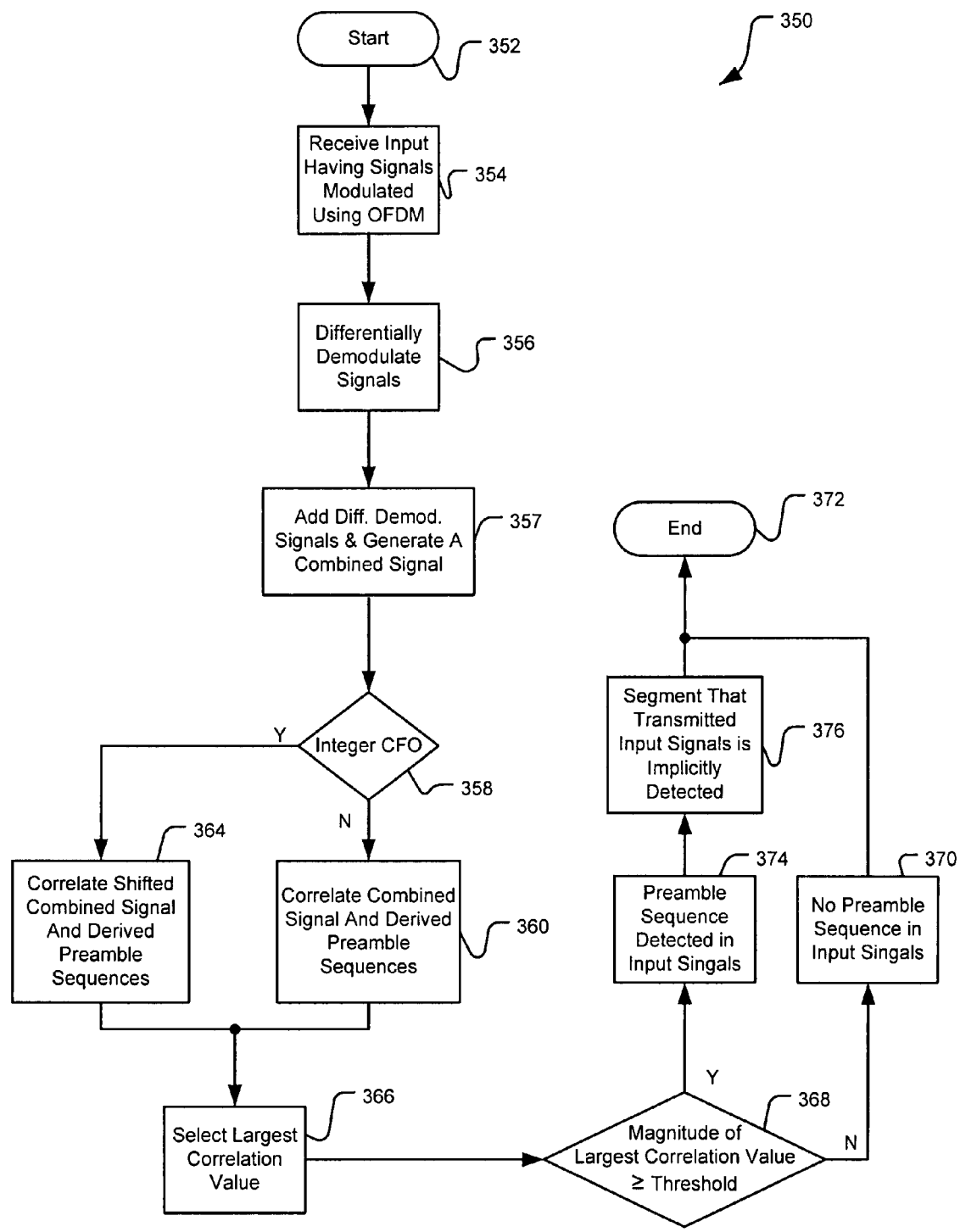
FIG. 9B is a flowchart of an exemplary method for detecting preamble sequences when sub-carriers have an unknown differential similar channel phase.

Referring now to FIG. 9B, a method 350 for detecting preamble sequences in signals received by a MS via at least two receive antennas when moderately frequency selective channels have substantially the same differential channel phase begins at step 352. A differential demodulation module 164 receives an input signal from each receive antennas in step 354 wherein each input signal includes sub-carriers that are modulated using orthogonal frequency division multiplexing (OFDM).

The differential demodulation module 164 differentially demodulates the input signals and generates differentially demodulated signals in step 356. A summing module 165 adds the differentially demodulated signals and generates a combined differentially demodulated signal in step 357.

A control module 168 determines in step 358 if an integer carrier frequency offset (CFO) is present in the input signals. If the integer CFO is absent, a correlation module 166 correlates the combined differentially demodulated signal with derived preamble sequences and generates correlation values in step 360. If the integer CFO is present, however, the correlation module 166 correlates in step 364 the derived preamble sequences with the combined differentially demodulated signal that include the shift caused by the integer CFO.

The control module 168 selects in step 366 a largest correlation value from the correlation values generated by the correlation module 166. The control module 168 checks if a magnitude of the largest correlation value is greater than or equal to a predetermined threshold in step 368. If false, the control module 168 determines in step 370 that no preamble sequence is detected in the input signals, and the method 350 ends in step 372.

If true, however, the control module 168 determines that a preamble sequence is detected in the input signals in step 374. Since each preamble sequence is unique and since each segment of each base station transmits using distinct sub-carriers, the control module 168 implicitly determines in step 376 which segment of a base station transmitted the detected preamble sequence. The method 350 ends in step 372.

Figure 9C:
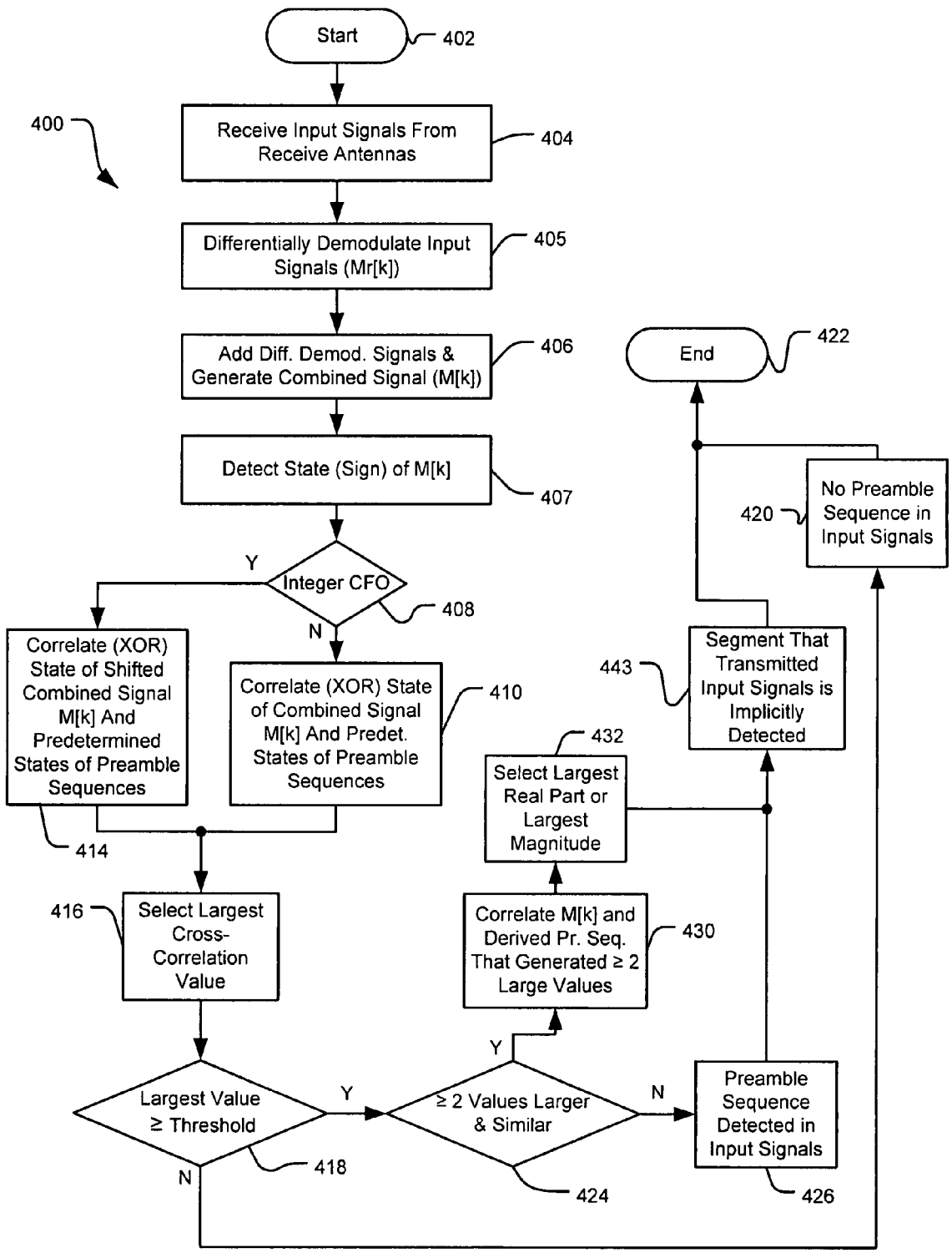
FIG. 9C is a flowchart of an exemplary method for detecting preamble sequences when sub-carriers have substantially similar channel phase.

Referring now to FIG. 9C, a method 400 for detecting preamble sequences in signals received by a MS via at least two receive antennas when moderately frequency selective channels have substantially the same channel phase begins at step 402. A differential demodulation module 164 receives an input signal from each receive antennas in step 404 wherein each input signal includes sub-carriers that are modulated using orthogonal frequency division multiplexing (OFDM).

The differential demodulation module 164 differentially demodulates the input signals and generates differentially demodulated signals in step 405. A summing module 165 adds the differentially demodulated signals and generates a combined differentially demodulated signal in step 406. A state detection module 185 detects states (i.e., signs) of symbols in the combined differentially demodulated signal in step 407.

A control module 188 determines in step 408 if an integer carrier frequency offset (CFO) is present in the input signal. If the integer CFO is absent, a modulo-2 summing module 186 cross-correlates (XORs) the states of the symbols in the combined differentially demodulated signal with predetermined sates of preamble sequences and generates cross-correlation values in step 410. If the integer CFO is present, however, the modulo-2 summing module 186 correlates in step 414 the predetermined states of preamble sequences with the states of symbols in the combined differentially demodulated signal that includes a shift caused by the integer CFO.

The control module 188 selects in step 416 a largest of the cross-correlation values generated by the modulo-2 summing module 186. The control module 188 checks if the largest cross-correlation value is greater than or equal to a predetermined threshold in step 418. If false, the control module 188 determines in step 420 that no preamble sequence is detected in the input signals, and the method 400 ends in step 422.

If true, however, the control module 188 checks if two or more cross-correlation values are similar and larger than the rest in step 424. If false, the control module 188 determines that a preamble sequence is detected in the input signals in step 426. Since each preamble sequence is unique and since each segment of each base station transmits using distinct sub-carriers, the control module 168 implicitly determines in step 443 which segment of a base station transmitted the detected preamble sequence. The method 400 ends in step 422.

If the result of step 424 is true, then in step 430, a correlation module 190 correlates the differentially demodulated signals and the derived preamble sequences that generated the two or more similar and large cross-correlation values. In step 432, the control module 188 selects either the real part or the magnitude of the largest of the correlation values generated by the correlation module 190. The control module 188 implicitly determines in step 443 which segment of a base station transmitted the detected preamble sequence. The method 400 ends in step 422.

Although every third sub-carrier is modulated as described in the systems and methods disclosed in this disclosure, skilled artisans can appreciate that the systems and methods disclosed herein may be implemented by modulating every $P^{th}$ sub-carrier, where P is an integer greater than 1. Thus, if P=2, the systems and methods disclosed herein may be implemented by modulating every other (i.e., alternate) sub-carrier, etc.

Figure 10B:
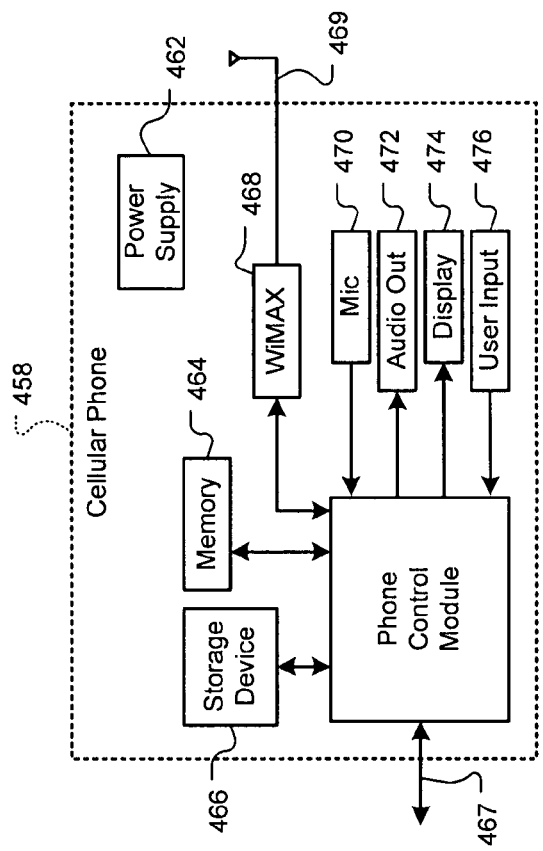
FIG. 10B is a functional block diagram of a cellular phone.
Figure 10A:
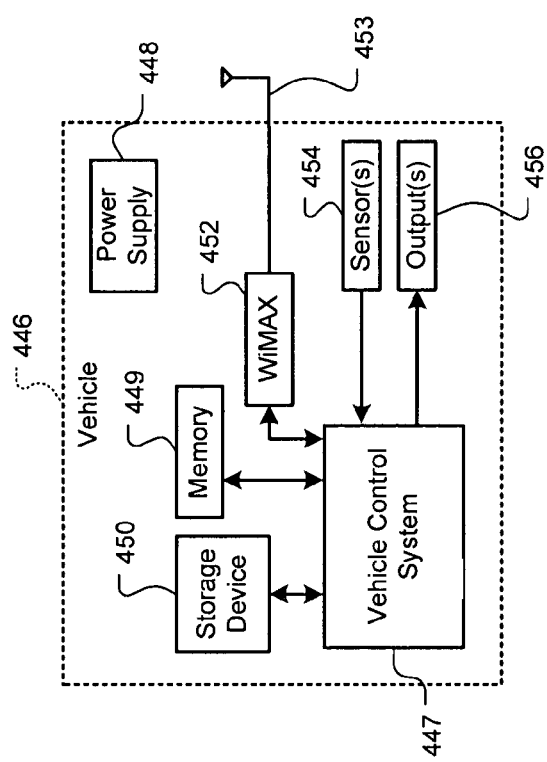
FIG. 10A is a functional block diagram of a vehicle control system.
Figure 10C:
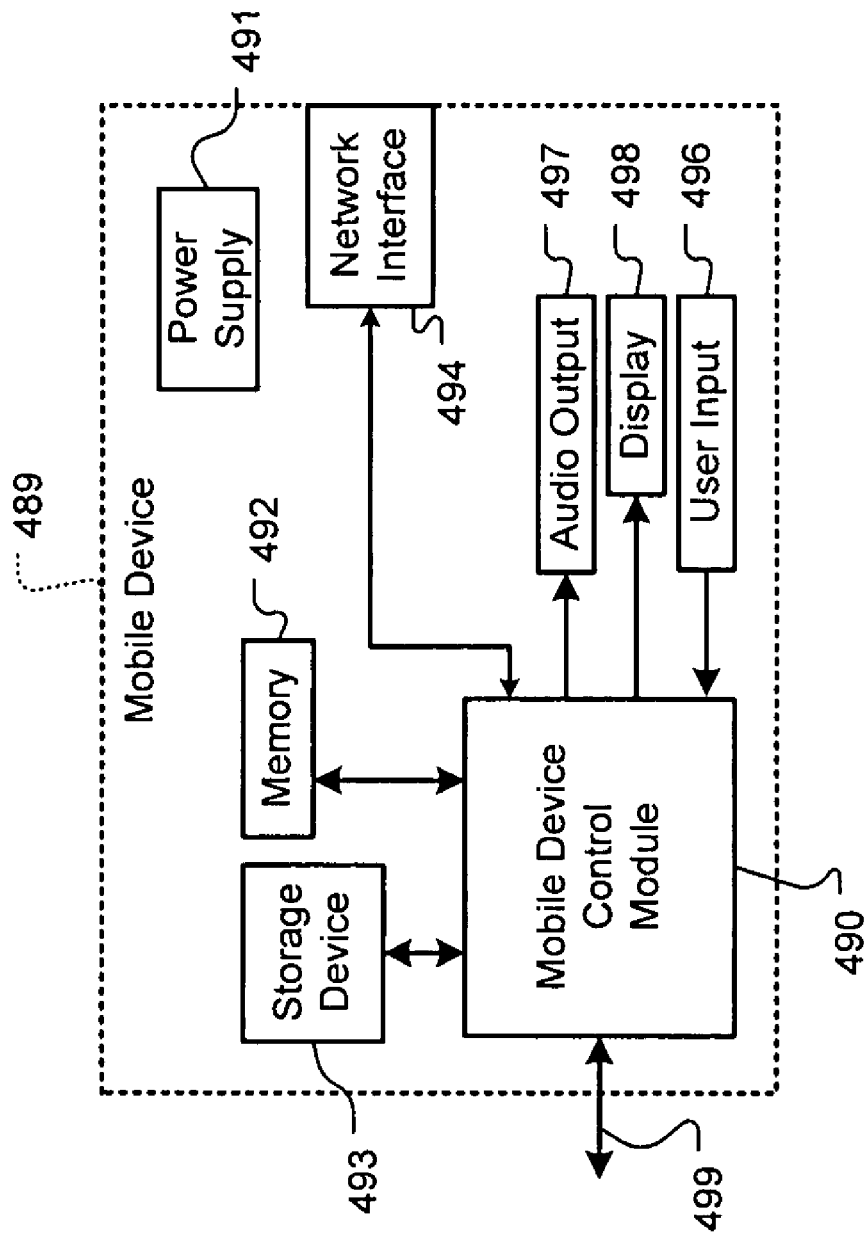
FIG. 10C is a functional block diagram of a mobile device.

Referring now to FIGS. 10A-10C, various exemplary implementations incorporating the teachings of the present disclosure are shown. Referring now to FIG. 10A, the teachings of the disclosure may be implemented in a WiMAX interface 452 of a vehicle 446. The vehicle 446 may include a vehicle control system 447, a power supply 448, memory 449, a storage device 450, the WiMAX interface 452, and a plurality of associated antennas 453. The vehicle control system 447 may be a powertrain control system, a body control system, an entertainment control system, an anti-lock braking system (ABS), a navigation system, a telematics system, a lane departure system, an adaptive cruise control system, etc.

The vehicle control system 447 may communicate with one or more sensors 454 and generate one or more output signals 456. The sensors 454 may include temperature sensors, acceleration sensors, pressure sensors, rotational sensors, airflow sensors, etc. The output signals 456 may control engine operating parameters, transmission operating parameters, suspension parameters, etc.

The power supply 448 provides power to the components of the vehicle 446. The vehicle control system 447 may store data in memory 449 and/or the storage device 450. Memory 449 may include random access memory (RAM) and/or nonvolatile memory such as flash memory, phase change memory, or multi-state memory, in which each memory cell has more than two states. The storage device 450 may include an optical storage drive, such as a DVD drive, and/or a hard disk drive (HDD). The vehicle control system 447 may communicate externally using the WiMAX interface 452.

Referring now to FIG. 10B, the teachings of the disclosure can be implemented in a WiMAX interface 468 of a cellular phone 458. The cellular phone 458 includes a phone control module 460, a power supply 462, memory 464, a storage device 466, and a cellular network interface 467. The cellular phone 458 may include the WiMAX interface 468 and a plurality of associated antennas 469, a microphone 470, an audio output 472 such as a speaker and/or output jack, a display 474, and a user input device 476 such as a keypad and/or pointing device.

The phone control module 460 may receive input signals from the cellular network interface 467, the WiMAX interface 468, the microphone 470, and/or the user input device 476. The phone control module 460 may process signals, including encoding, decoding, filtering, and/or formatting, and generate output signals. The output signals may be communicated to one or more of memory 464, the storage device 466, the cellular network interface 467, the WiMAX interface 468, and the audio output 472.

Memory 464 may include random access memory (RAM) and/or nonvolatile memory such as flash memory, phase change memory, or multi-state memory, in which each memory cell has more than two states. The storage device 466 may include an optical storage drive, such as a DVD drive, and/or a hard disk drive (HDD). The power supply 462 provides power to the components of the cellular phone 458.

Referring now to FIG. 10C, the teachings of the disclosure can be implemented in a network interface 494 of a mobile device 489. The mobile device 489 may include a mobile device control module 490, a power supply 491, memory 492, a storage device 493, the network interface 494, and an external interface 499. The network interface 494 includes a WiMAX interface and an antenna (not shown).

The mobile device control module 490 may receive input signals from the network interface 494 and/or the external interface 499. The external interface 499 may include USB, infrared, and/or Ethernet. The input signals may include compressed audio and/or video, and may be compliant with the MP3 format. Additionally, the mobile device control module 490 may receive input from a user input 496 such as a keypad, touchpad, or individual buttons. The mobile device control module 490 may process input signals, including encoding, decoding, filtering, and/or formatting, and generate output signals.

The mobile device control module 490 may output audio signals to an audio output 497 and video signals to a display 498. The audio output 497 may include a speaker and/or an output jack. The display 498 may present a graphical user interface, which may include menus, icons, etc. The power supply 491 provides power to the components of the mobile device 489. Memory 492 may include random access memory (RAM) and/or nonvolatile memory such as flash memory, phase change memory, or multi-state memory, in which each memory cell has more than two states. The storage device 493 may include an optical storage drive, such as a DVD drive, and/or a hard disk drive (HDD). The mobile device may include a personal digital assistant, a media player, a laptop computer, a gaming console, or other mobile computing device.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A system comprising:
   a differential demodulation module that (i) receives modulated signals from R antennas and (ii) differentially demodulates said modulated signals to generate differentially demodulated signals, where R is an integer greater than 1:
   a first summing module that sums said differentially demodulated signals to generate a combined signal;
   a state detection module that detects states of X symbols in said combined signal, where X is an integer greater than 1, and where each of said X symbols has one of a first state and a second state; and
   a second summing module that (i) receives Y preamble sequences each comprising X predetermined symbols and (ii) generates X sums for each of said Y preamble sequences by adding each of said states of said X symbols with corresponding states of said X predetermined symbols of each of Y preamble sequences, where Y is an integer greater than 1,
   wherein said states of said X predetermined symbols are generated by inverting states of derived symbols in derived preamble sequences,
   wherein said derived preamble sequences are derived from said Y preamble sequences,
   wherein each of said Y preamble sequences is different from others of said Y preamble sequences, and
   wherein each of said derived symbols of one of said derived preamble sequences has a first binary value when a corresponding symbol and a symbol adjacent to said corresponding symbol in a corresponding one of said Y preamble sequences have opposite binary values, and said each of said derived symbols has a second binary value that is opposite to said first binary value when said corresponding symbol and said symbol adjacent to said corresponding symbol have the same binary value.

2. The system of claim 1, wherein said modulated signals include sub-carriers that are modulated using orthogonal frequency domain multiplexing (OFDM).

3. The system of claim 2, wherein every $P^{th}$ one of said sub-carriers is modulated with a preamble symbol from one of said Y preamble sequences, where P is an integer greater than or equal to 1.

4. The system of claim 3, wherein said every $P^{th}$ one of said sub-carriers has one of substantially the same channel phase and substantially the same differential channel phase.

5. The system of claim 3, wherein said differential demodulation module generates said differentially demodulated signals by multiplying a $Q^{th}$ one of said modulated signals by a complex conjugate of a $(Q+P)^{th}$ one of said modulated signals, where Q is an integer greater than or equal to 1.

6. The system of claim 5, wherein said states of said X symbols in said combined signal are states of real parts of said X symbols when imaginary parts of said X symbols are approximately equal to zero.

7. The system of claim 1, wherein said X sums are modulo-2 sums.

8. The system of claim 1, wherein said states of said X predetermined symbols are generated by inverting states of derived symbols in derived preamble sequences, wherein said derived preamble sequences are derived from said Y preamble sequences, and wherein each of said Y preamble sequences is different from others of said Y preamble sequences.

9. The system of claim 1, wherein said derived preamble sequences have a cross-correlation value that is less than or equal to a predetermined cross-correlation threshold.

10. The system of claim 9, wherein said predetermined cross-correlation threshold is less than approximately 0.2 for an orthogonal frequency domain multiplexing (OFDM) system using a 1024 fast Fourier transform (FFT) mode.

11. The system of claim 1, wherein said modulated signals include a fractional carrier frequency offset (CFO) that generates a phase error that is substantially the same in each one of said modulated signals.

12. The system of claim 1, wherein said modulated signals include an integer carrier frequency offset (CFO) that generates a phase error that is substantially the same in each one of said modulated signals.

13. A physical layer (PHY) device comprising:
    the system of claim 1; and
    R transceiver modules in communication with said differential demodulation module, wherein said R transceiver modules receive said modulated signals.

14. A network device comprising:
    the PHY device of claim 13; and
    said R antennas that communicate with corresponding ones of said R transceiver modules.

15. A system comprising:
    a differential demodulation module that (i) receives modulated signals from R antennas and (ii) differentially demodulates said modulated signals to generate differentially demodulated signals, where R is an integer greater than 1;

a first summing module that sums said differentially demodulated signals to generate a combined signal;

a state detection module that detects states of X symbols in said combined signal, where X is an integer greater than 1, and where each of said X symbols has one of a first state and a second state;

a second summing module that (i) receives Y preamble sequences each comprising X predetermined symbols and (ii) generates X sums for each of said Y preamble sequences by adding each of said states of said X symbols with corresponding states of said X predetermined symbols of each of Y preamble sequences, where Y is an integer greater than 1, wherein said second summing module generates cross-correlation values by adding said X sums generated for each of said Y preamble sequences;

a control module in communication with said differential demodulation module and said second summing module, wherein said control module (i) selects a largest one of said cross-correlation values, and (ii) detects one of said Y preamble sequences in said modulated signals when said largest one of said cross-correlation values is greater than or equal to a predetermined threshold; and a correlation module in communication with said differential demodulation module and said control module, wherein said correlation module generates correlation values by correlating (i) at least one of said differentially demodulated signals and (ii) at least one of derived preamble sequences that generate at least two of said cross-correlation values, wherein said cross-correlation values are greater than said predetermined threshold and are substantially the same.

16. The system of claim 15, wherein said predetermined threshold is based on a signal strength of said modulated signals.

17. The system of claim 15, wherein, based on said one of said Y preamble sequences detected in said modulated signals, said control module identifies a segment of a base station that transmitted said modulated signals.

18. The system of claim 15, wherein said control module selects said largest of said cross-correlation values based on a signal strength of said modulated signals.

19. The system of claim 15, wherein said control module (i) selects one of said correlation values having a largest real part, (ii) detects one of said Y preamble sequences in said modulated signals based on said largest real part, and (iii) identifies, based on said one of said Y preamble sequence detected in said modulated signals, a segment of a base station that transmitted said modulated signals.

20. The system of claim 15, wherein said control module (i) selects one of said correlation values having a largest magnitude, (ii) detects one of said preamble sequences in said modulated signals based on said largest magnitude, and (iii) identifies, based on said one of said Y preamble sequence detected in said modulated signals, a segment of a base station that transmitted said modulated signals.

21. The system of claim 15, wherein said control module generates an estimate for an integer carrier frequency offset (CFO) present in said modulated signals when said control module selects largest of said cross-correlation values.

22. A method comprising:
receiving modulated signals from R antennas, where R is an integer greater than 1;

differentially demodulating said modulated signals to generate differentially demodulated signals;

summing said differentially demodulated signals to generate a combined signal;

detecting states of X symbols in said combined signal, where X is an integer greater than 1, and where each of said X symbols has one of a first state and a second state;

receiving Y preamble sequences each comprising X predetermined symbols;

generating X sums for each of said Y preamble sequences by adding each of said states of said X symbols with corresponding states of said X predetermined symbols of each of Y preamble sequences, where Y is an integer greater than 1; and generating said states of said X predetermined symbols by inverting states of derived symbols in derived preamble sequences, wherein said derived preamble sequences are derived from said Y preamble sequences, wherein each of said Y preamble sequences is different from others of said Y preamble sequences, and wherein each of said derived symbols of one of said derived preamble sequences has a first binary value when a corresponding symbol and a symbol adjacent to said corresponding symbol in a corresponding one of said Y preamble sequences have opposite binary values, and said each of said derived symbols has a second binary value that is opposite to said first binary value when said corresponding symbol and said symbol adjacent to said corresponding symbol have the same binary value.

23. The method of claim 22, further comprising differentially demodulating said modulated signals that include sub-carriers modulated using orthogonal frequency domain multiplexing (OFDM).

24. The method of claim 23, wherein every $P^{th}$ one of said sub-carriers is modulated with a preamble symbol from one of said Y preamble sequences, where P is an integer greater than or equal to 1.

25. The method of claim 24, wherein said every $P^{th}$ one of said sub-carriers has one of substantially the same channel phase and substantially the same differential channel phase.

26. The method of claim 24, further comprising generating said differentially demodulated signals by multiplying a $Q^{th}$ one of said modulated signals by a complex conjugate of a $(Q+P)^{th}$ one of said modulated signals, where Q is an integer greater than or equal to 1.

27. The method of claim 26, wherein said states of said X symbols in said combined signal are states of real parts of said X symbols when imaginary parts of said X symbols are approximately equal to zero.

28. The method of claim 22, wherein said X sums are modulo-2 sums.

29. The method of claim 22, further comprising generating said states of said X predetermined symbols by inverting states of derived symbols in derived preamble sequences, wherein said derived preamble sequences are derived from said Y preamble sequences, and wherein each of said Y preamble sequences is different from others of said Y preamble sequences.

30. The method of claim 22, wherein said derived preamble sequences have a cross-correlation value that is less than or equal to a predetermined cross-correlation threshold.

31. The method of claim 30, wherein said predetermined cross-correlation threshold is less than approximately 0.2 for an orthogonal frequency domain multiplexing (OFDM) method using a 1024 fast Fourier transform (FFT) mode.

32. The method of claim 22, further comprising differentially demodulating said modulated signals that include a fractional carrier frequency offset (CFO), wherein said fractional CFO generates a phase error that is substantially the same in each one of said modulated signals.

33. The method of claim 22, further comprising differentially demodulating said modulated signals that include an integer carrier frequency offset (CFO), wherein said integer CFO generates a phase error that is substantially the same in each one of said modulated signals.

34. The method of claim 22, further comprising receiving said modulated signals from said R antennas via corresponding ones of R transceiver modules of a physical layer (PHY) device.

35. A method comprising:
   receiving modulated signals from R antennas, where R is an integer greater than 1;
   differentially demodulating said modulated signals to generate differentially demodulated signals;
   summing said differentially demodulated signals to generate a combined signal;
   detecting states of X symbols in said combined signal, where X is an integer greater than 1, and where each of said X symbols has one of a first state and a second state;
   receiving Y preamble sequences each comprising X predetermined symbols;
   generating X sums for each of said Y preamble sequences by adding each of said states of said X symbols with corresponding states of said X predetermined symbols of each of Y preamble sequences, where Y is an integer greater than 1;
   generating cross-correlation values by adding said X sums generated for each of said Y preamble sequences;
   selecting a largest one of said cross-correlation values and detecting one of said Y preamble sequences in said modulated signals when said largest one of said cross-correlation values is greater than or equal to a predetermined threshold; and
   generating correlation values by correlating at least one of said differentially demodulated signals and at least one of derived preamble sequences that generate at least two of said cross-correlation values, wherein said cross-correlation values are greater than said predetermined threshold and are substantially the same.

36. The method of claim 35, further comprising calculating said predetermined threshold based on a signal strength of said modulated signals.

37. The method of claim 35, further comprising identifying, based on said one of said Y preamble sequences detected in said modulated signals, a segment of a base station that transmitted said modulated signals.

38. The method of claim 35, further comprising selecting said largest of said cross-correlation values based on a signal strength of said modulated signals.

39. The method of claim 35, further comprising (i) selecting one of said correlation values having a largest real part, (ii) detecting one of said Y preamble sequences in said modulated signals based on said largest real part, and (iii) identifying, based on said one of said Y preamble sequence detected in said modulated signals, a segment of a base station that transmitted said modulated signals.

40. The method of claim 35, further comprising (i) selecting one of said correlation values having a largest magnitude, (ii) detecting one of said preamble sequences in said modulated signals based on said largest magnitude, and (iii) identifying, based on said one of said Y preamble sequence detected in said modulated signals, a segment of a base station that transmitted said modulated signals.

41. The method of claim 35, further comprising generating an estimate for an integer carrier frequency offset (CFO) present in said modulated signals when selecting said largest of said cross-correlation values.

\* \* \* \* \*